United States Patent
Satish et al.

(10) Patent No.: US 10,572,402 B2
(45) Date of Patent: Feb. 25, 2020

(54) STORAGE DEVICE COMMUNICATING WITH HOST ACCORDING TO MULTICAST COMMUNICATION PROTOCOL AND COMMUNICATION METHOD OF HOST

(71) Applicant: Samsung Electronics Co., Ltd., Suwon-si, Gyeonggi-do (KR)

(72) Inventors: Kumar Satish, Suwon-si (KR); Jupyung Lee, Incheon (KR); In Hwan Doh, Seoul (KR); JooYoung Hwang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/964,737

(22) Filed: Apr. 27, 2018

(65) Prior Publication Data
US 2019/0087362 A1 Mar. 21, 2019

(30) Foreign Application Priority Data
Sep. 20, 2017 (KR) .......................... 10-2017-0121411

(51) Int. Cl.
*G06F 13/16* (2006.01)
*G06F 3/06* (2006.01)
*G06F 13/42* (2006.01)

(52) U.S. Cl.
CPC ........ *G06F 13/1642* (2013.01); *G06F 3/0611* (2013.01); *G06F 3/0659* (2013.01); *G06F 3/0683* (2013.01); *G06F 13/1668* (2013.01); *G06F 13/1694* (2013.01); *G06F 13/4282* (2013.01); *G06F 3/0689* (2013.01)

(58) Field of Classification Search
CPC .......................... G06F 13/1668; G06F 3/0689
See application file for complete search history.

(56) References Cited

U.S. PATENT DOCUMENTS

| | | | |
|---|---|---|---|
| 8,627,015 B2 | 1/2014 | Durocher et al. | |
| 8,819,304 B2 | 8/2014 | Shapiro et al. | |
| 8,909,864 B2 | 12/2014 | Black et al. | |
| 9,170,755 B2 | 10/2015 | Sharifie et al. | |
| 2002/0083281 A1* | 6/2002 | Carteau | G06F 11/2076 711/161 |
| 2008/0313505 A1* | 12/2008 | Lee | G06F 12/0246 714/47.2 |
| 2014/0189212 A1* | 7/2014 | Slaight | G06F 12/0866 711/103 |
| 2016/0077964 A1 | 3/2016 | Chang et al. | |
| 2016/0378402 A1 | 12/2016 | Amidi et al. | |

FOREIGN PATENT DOCUMENTS

JP 2004-139260 A 5/2004

* cited by examiner

*Primary Examiner* — Zachary K Huson
(74) *Attorney, Agent, or Firm* — Harness, Dickey & Pierce, P.L.C.

(57) ABSTRACT

A storage device includes a memory device; and a controller configured to fetch a command from a host, the command indicating a logical address, process the command based on the logical address, and receive, from a first replica storage device, an acknowledgment signal indicating that the command has been processed by the first replica storage device.

20 Claims, 15 Drawing Sheets

STORAGE DEVICE COMMUNICATING WITH HOST ACCORDING TO MULTICAST COMMUNICATION PROTOCOL AND COMMUNICATION METHOD OF HOST

CROSS-REFERENCE TO RELATED APPLICATIONS

This U.S. non-provisional application claims priority under 35 U.S.C. § 119 to Korean Patent Application No. 10-2017-0121411, filed on Sep. 20, 2017, in the Korean Intellectual Property Office, the entire contents of which are incorporated herein by reference.

BACKGROUND

1. Field

At least some example embodiments of the inventive concepts disclosed herein relate to a storage device and a communication method of a host, and more particularly, relate to a storage device communicating with the host according to a multicast communication protocol and a communication method of the host.

2. Related Art

A flash memory device is being used as voice and image data storage media of information devices such as a computer, a smartphone, a personal digital assistant (PDA), a digital camera, a voice recorder, an MP3 player, and a handheld PC. An example of a flash memory based mass storage device is a solid state drive (hereinafter referred to as "SSD"). An interface of the SSD should provide an optimal speed and reliability depending on various purposes of the SSD. To satisfy such requirements, interfaces such as a serial AT attachment (SATA) interface, a PCI Express (PCIe) interface, and a serial attached SCSI (SAS) may be used as the optimal SSD interface. In particular, a PCIe-based NVM express (NVMe) is studied and applied.

A host may communicate with a plurality of SSDs for distributing and managing data. The host may communicate with SSDs according to a peer to peer (P2P) communication method. However, if the host provides a command to any one of the SSDs according to the P2P communication method, an SSD that receives the command has to provide the received command to another SSD, thereby causing an increase in a time (i.e., a latency) taken to process the command. Also, a memory space is necessary for each SSD to provide a command to any other SSD and receive completion information of the command.

SUMMARY

At least some example embodiments of the inventive concepts provide a storage device communicating with a host according to a multicast communication protocol and a communication method of the host.

According to at least some example embodiments of the inventive concepts, a storage device includes a memory device; and a controller, the controller being configured to fetch a command from a host, the command indicating a logical address, process the command based on the logical address, and receive, from a first replica storage device, an acknowledgment signal indicating that the command has been processed by the first replica storage device.

According to at least some example embodiments of the inventive concepts, a storage device includes a memory device; and a controller, the controller being configured to, fetch a command from a host, the command indicating logical address; process the command based on the logical address; and transmit, to a master storage device, an acknowledgment signal indicating that the command has been processed.

According to at least some example embodiments of the inventive concepts, a communication method of a host connected with first and second storage devices includes generating a command for controlling the first and second storage devices; causing the first and second storage devices to fetch the command by updating at least a register of the first storage device; and receiving completion information of the command from the first storage device when the command is processed in the second storage device and the second storage device transmits an acknowledgment signal indicating that the command is processed to the first storage device.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
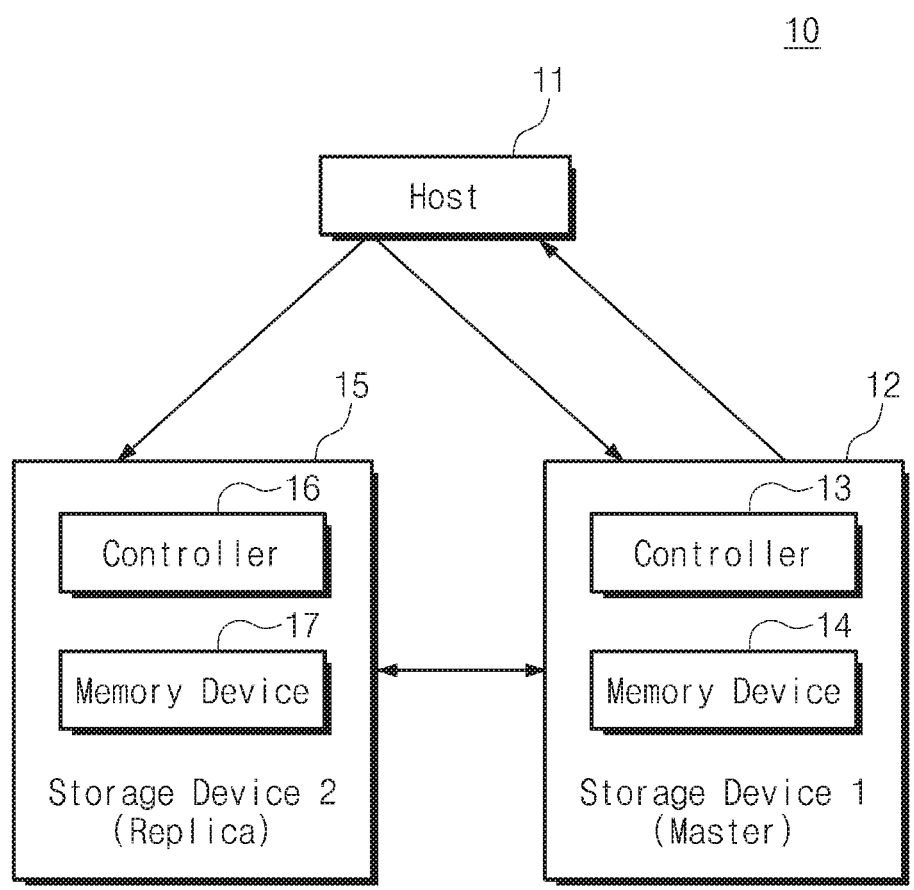
FIG. 1 is a block diagram illustrating a storage system according to at least some example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

At least some example embodiments of the inventive concepts provide a computing system for providing high security and reliability of firmware by using a hardware security module and a firmware managing method thereof.

FIG. 1 is a block diagram illustrating a storage system according to at least some example embodiments of the inventive concepts. Referring to FIG. 1, a storage system 10 may include a host 11, a first storage device 12, and a second storage device 15.

The host 11 may write data in the first storage device 12 or may read data from the first storage device 12. To this end, the host 11 may generate various commands to control the first storage device 12. In general, a command processing process of the host 11 is as follows. The host 11 may transmit a command to the first storage device 12 and may receive completion information and an interrupt, which are associated with the transmitted command, from the first storage device 12. The host 11 may perform interrupt processing for completing a thread or a task associated with the transmitted command, in response to the interrupt.

The first storage device 12 may fetch a command that the host 11 generates. Depending on the command generated by the host 11, the first storage device 12 may store data or may transmit data to the host 11. The second storage device 15 may back up data for coping with the event that an operation of the first storage device 12 goes down or that the failure occurs in the first storage device 12. That is, the first storage device 12 may be a master storage device, and the second storage device 15 may be a replica storage device. One of at least two storage devices may be a master device, and the other thereof may be a replica storage device. The master storage device may manage any other storage device except itself and may notify the host 11 that a command is completed. The replica storage device may back up or copy data that the master storage device stores and may notify the master device of its own task or processing state.

In the present disclosure, an operation of a storage device "going down" is synonymous with, and may also be referred to as, the storage device malfunctioning and/or the storage device having stopped operating.

The first storage device 12 may include a controller 13 and a memory device 14. The controller 13 may process a command that the host 11 generates, by storing data in the memory device 14 or reading data from the memory device 14. The memory device 14 may store or output data based on control of the controller 13.

The second storage device 15 may include a controller 16 and a memory device 17. For example, the second storage device 15 may be implemented to be the same as the first storage device 12. The controller 16 and the memory device 17 may operate in a manner similar to the controller 13 and the memory device 14 of the first storage device 12. As in the first storage device 12, the second storage device 15 may fetch a command that the host 11 generates.

According to at least some example embodiments of the inventive concepts, the host 11 may transmit a command to at least two storage devices such as the first and second storage devices 12 and 15. That is, the host 11 may multicast a command to the first and second storage devices 12 and 15.

The first and second storage devices 12 and 15 may fetch a command that the host 11 generates, in parallel. In the example illustrated in FIG. 1, the first storage device 12 is a master storage device and the second storage device 15 is a replica storage device. However, unlike illustration, depending on a command that the host 11 generates, the first storage device 12 may be a replica storage device, and the second storage device 15 may be a master storage device. That is, roles of the first and second storage devices 12 and 15 may be changed according to a command that the host 11 generates.

Even though the host 11 multicasts a command to the first and second storage devices 12 and 15, whether any device of the first and second storage devices 12 and 15 is a master storage device may not be important. Any one of the first and second storage devices 12 and 15 may perform a role of a master storage device on data that the host 11 requests, and the other thereof may perform a role of a replica storage device. To determine a master storage device and a replica storage device may be performed by the first and second storage devices 12 and 15. That is, each of the first and second storage devices 12 and 15 may determine its own role based on a command that the host 11 generates. A physical configuration of the host 11 will be described below.

Figure 2:
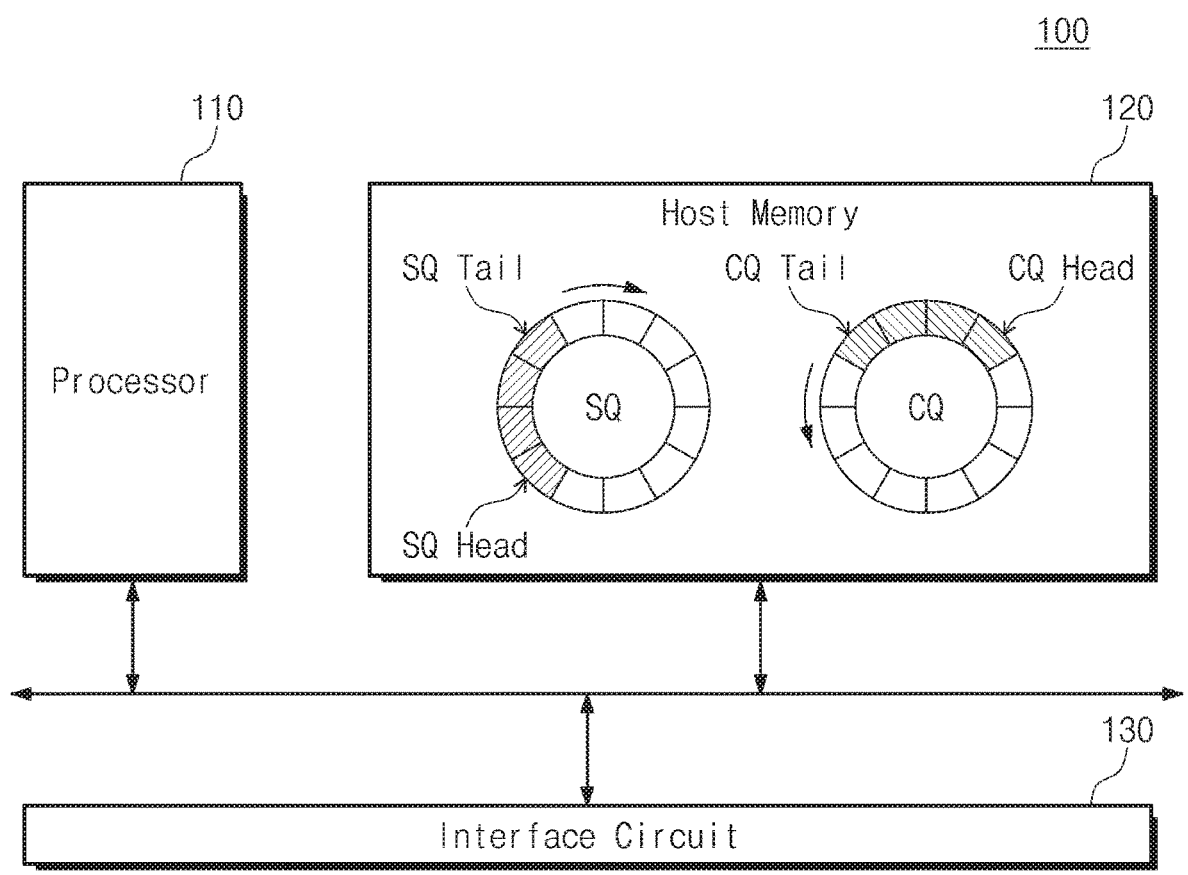
FIG. 2 is a block diagram illustrating a host illustrated in FIG. 1.

FIG. 2 is a block diagram illustrating a host illustrated in FIG. 1. FIG. 2 will be described with reference to FIG. 1.

Referring to FIG. 2, a host 100 may include a processor 110, a host memory 120, and an interface circuit 130.

The processor 110 may execute a variety of software (e.g., an application program, an operating system, and a device driver) loaded on the host memory 120. The processor 110 may execute an operating system (OS) and an application program. The processor 110 may be a homogeneous multi-core processor or a heterogeneous multi-core processor.

An application program or data to be processed by the processor 110 may be loaded on the host memory 120. In more detail, a submission queue SQ for managing a queue for a command to be transmitted to the first and second storage devices 12 and 15 (refer to FIG. 1) and a completion queue CQ for managing a queue for completion information of a transmitted command may be loaded on the host memory 120. A specific area of the host memory 120 may be allocated in advance for the submission queue SQ and the completion queue CQ. The submission queue SQ and the completion queue CQ may be referred to as a "circular buffer".

The submission queue SQ that is a queue of submission entries written by the host 100 may correspond to commands to be transmitted to the first and second storage devices 12 and 15. The completion queue CQ that is a queue of completion entries written by any one of the first and second storage devices 12 and 15 may indicate whether a command requested by the host 100 is completed or completion information.

The submission queue SQ may be written or supplied by the host 100 and may be fetched or consumed by the first and second storage devices 12 and 15. A tail pointer TP of the submission queue SQ may be updated by the host 100, and a location of a new tail pointer TP may be transmitted to the first and second storage devices 12 and 15 by the host 100. Any one of the first and second storage devices 12 and 15 may transmit completion information, and thus, a head pointer HP of the submission queue SQ may be updated.

The completion queue CQ may be written or supplied by the first and second storage devices 12 and 15 and may be processed or consumed by the host 100. A tail pointer TP of the completion queue CQ may be updated by any one of the first and second storage devices 12 and 15. The host 100 may progress the head pointer HP of the completion queue CQ in response to an interrupt transmitted from any one of the first and second storage devices 12 and 15, and a location of a new head pointer HP may be transmitted to the first and second storage devices 12 and 15.

The interface circuit 130 may provide a physical connection between the host 100 and the first and second storage devices 12 and 15. That is, the interface circuit 130 may convert a command, an address, data, etc. corresponding to various access requests issued from the host 100 depending on a way to interface with the first and second storage devices 12 and 15. A communication protocol of the interface circuit 130 may include at least one of a universal serial bus (USB) protocol, a small computer system interface (SCSI) protocol, a PCI express protocol, NVM express (NVMe) protocol, an ATA protocol, a parallel ATA (PATA) protocol, a serial ATA (SATA) protocol, and a serial attached SCSI (SAS) protocol. According to at least one example embodiment of the inventive concepts, an NVM express (NVMe) protocol for exchanging data in a PCIe manner may be applied to the interface circuit 130. A physical configuration of the first and second storage devices 12 and 15 of FIG. 1 will be described below.

Figure 3:
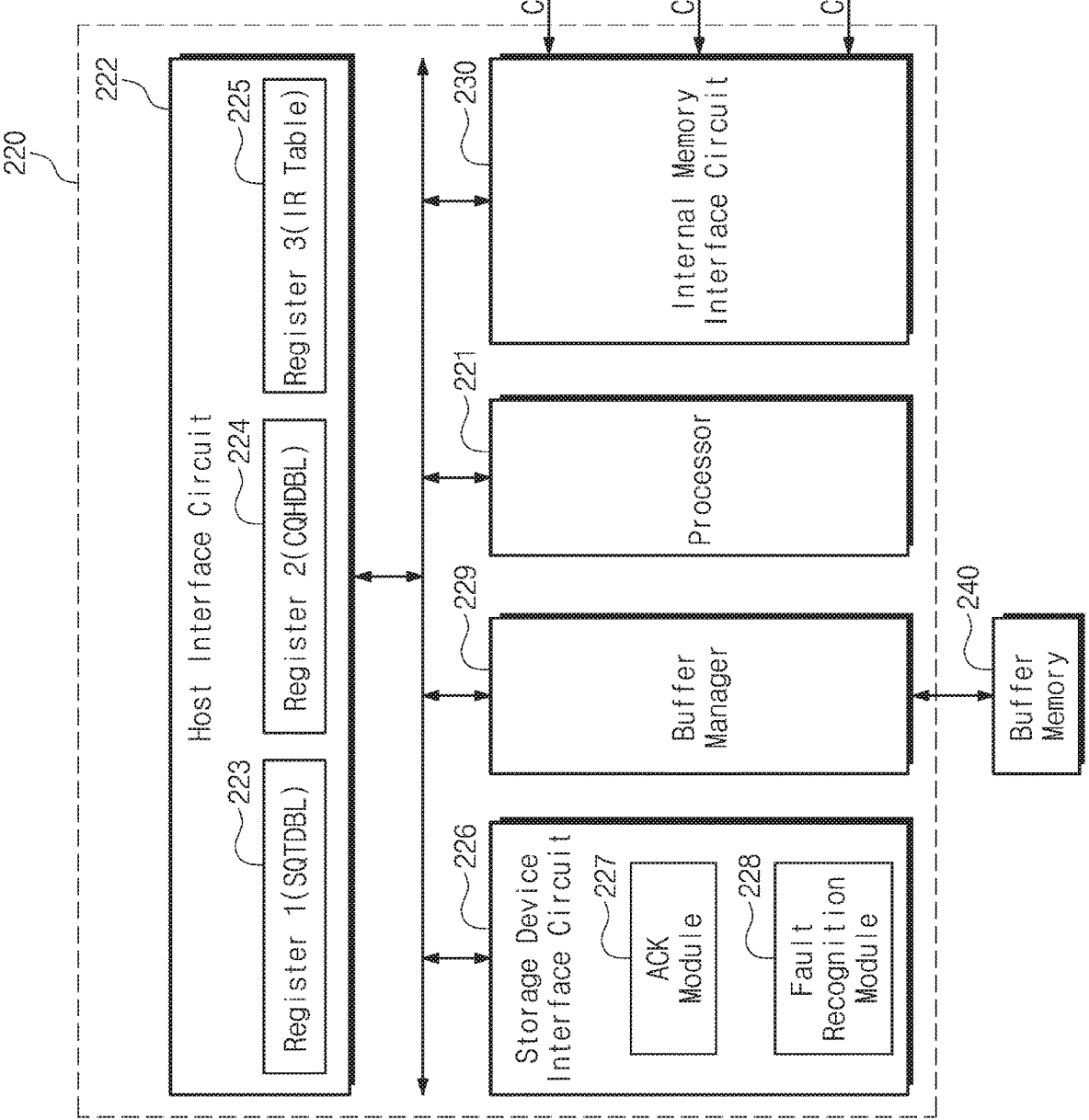
FIG. 3 is block diagram illustrating a storage device illustrated in FIG. 1.

FIG. 3 is block diagram illustrating a storage device illustrated in FIG. 1. FIG. 3 will be described with reference to FIG. 1. A configuration of a storage device 200 illustrated in FIG. 3 may be a configuration of each of the first and second storage devices 12 and 15 of FIG. 1. Referring to FIG. 3, the storage device 200 may include memory devices 211 to 213, a controller 220, and a buffer memory 240.

The memory devices 211 to 213 may perform a data input/output under control of the controller 220. For example, each of the memory devices 211 to 213 may include a volatile memory such as a dynamic random access memory (DRAM) or a static random access memory (SRAM) or a nonvolatile memory such as a NAND flash memory, a NOR flash memory, a resistive random access memory (ReRAM), a ferroelectric random access memory (FRAM), a phase change random access memory (PRAM), a thyristor random access memory (TRAM), or a magnetic random access memory (MRAM). The number of memory devices and the number of channels illustrated in FIG. 3 are examples and at least some example embodiments of the inventive comments are not limited thereto.

The controller 220 may provide an interface between the host 11 (refer to FIG. 1) and the storage device 200. The controller 220 may include a processor 221, a host interface circuit 222, a storage device interface circuit 226, a buffer manager 229, and an internal memory interface circuit 230.

The processor 221 may control operations of internal components of the controller 220. The processor 221 may provide a variety of control information, which is needed to perform a read operation or a write operation for the memory devices 211 to 213, to the host interface circuit 222, the storage device interface circuit 226, the buffer manager 229, and the internal memory interface circuit 230. The processor 221 may operate depending on firmware provided for various control operations of the controller 220. For example, the processor 221 may execute a flash translation layer (FTL) for performing a garbage collection operation, an address managing operation, a wear leveling operation, etc. for managing the memory devices 211 to 213.

The host interface circuit 222 may communicate with the host 100. For example, the host interface circuit 222 may include a first register 223 for writing a submission queue tail doorbell SQTDBL of the host 100. The host interface circuit 222 may further include a second register 224 for writing a completion queue head doorbell CQHDBL of the host 100. The first register 223 may store information of a submission queue SQ of the host 100, and the second register 224 may store information of a completion queue CQ of the host 100. The submission queue tail doorbell SQTDBL may indicate a value of a tail pointer of a submission queue, and the completion queue head doorbell CQHDBL may indicate a value of a head pointer of a completion queue. The host interface circuit 222 may further include a third register 225 for storing an interrupt (IR) table to manage interrupts to be generated according to a state of the second register 224.

The host interface circuit 222 may be configured to operate depending on a communication protocol applied to the interface circuit 130 of the host 100 described with reference to FIG. 2. According to at least one example embodiment of the inventive concepts, an NVMe protocol for exchanging data in a PCIe manner may be applied to the host interface circuit 222.

The storage device interface circuit 226 may communicate with any other storage device (e.g., any one of the first and second storage devices 12 and 15 of FIG. 1). For example, the communication protocol of the storage device interface circuit 226 may be at least one of USB, SCSI, PCIe, NVMe, ATA, PATA, SATA, and SAS protocols.

The storage device interface circuit 226 may include an acknowledgment module 227 for exchanging an acknowledgment signal with any other storage device. According to at least one example embodiment of the inventive concepts, in the case where the storage device 200 is a master storage device, the acknowledgment module 227 may receive an acknowledgment signal from a replica storage device. In this case, the acknowledgment signal may indicate that a command of the host 11 is processed by the replica storage device. According to at least another example embodiment of the inventive concepts, in the case where the storage device 200 is a replica storage device, the acknowledgment module 227 may transmit an acknowledgment signal to a master storage device. In this case, the acknowledgment signal may indicate that a command of the host 11 is processed in the controller 220 or a replica storage device.

The storage device interface circuit 226 may further include a fault recognition module 228 for exchanging an inquiry signal and a response signal with any other storage device. The fault recognition module 228 may transmit an inquiry signal to any other storage device and may receive a response signal therefrom. Alternatively, the fault recognition module 228 may receive an inquiry signal from any other storage device and may transmit a response signal thereto. The inquiry signal refers to a signal for determining whether an operation of any other storage device goes down or whether a fault occurs, and the response signal refers to a signal transmitted as a response from a storage device receiving the inquiry signal. For example, the inquiry signal may be referred to as a "heart beat signal". According to at least one example embodiment of the inventive concepts, the acknowledgment module 227 and fault recognition module 228 are separated from each other. However, according to at least some example embodiments of the inventive concepts, the acknowledgment module 227 and fault recognition module 228 may be implemented in a single integrated circuit or may be implemented within the controller 220 in the form of software.

The buffer manager 229 controls read and write operations of the buffer memory 240. For example, the buffer manager 229 may temporarily store write data or read data for the memory devices 211 to 213 in the buffer memory 240. The buffer manager 229 may manage an area of the buffer memory 240 under control of the processor 221.

The internal memory interface circuit 230 may exchange data with the memory devices 211 to 213. The internal memory interface circuit 230 may write data from the buffer memory 240 in the memory devices 211 to 213 through channels CH1 to CH3. Afterwards, read data output from the memory devices 211 to 213 through the channels CH1 to CH3 may be collected by the internal memory interface circuit 230. The collected data may be transmitted to the host 100 after being stored in the buffer memory 240 or may be directly transmitted to the host 100.

According to at least one example embodiment of the inventive concepts, internal components (the processor 221, the host interface circuit 222, the first to third registers 223 to 225, the storage device interface circuit 226, the acknowledgment module 227, the fault recognition module 228, the buffer manager 229, and the internal memory interface circuit 230) of the controller 220 may be separated and implemented as illustrated in FIG. 3.

According to at least another example embodiment of the inventive concepts, unlike illustration, the internal components of the controller 220 may be integrated and implemented on a single integrated circuit such as a system on chip (SoC), an application specific integrated circuit (ASIC), or a field programmable gate array (FPGA). In this case, the internal components illustrated in FIG. 3 may be implemented in the form of software.

The buffer memory 240 operates as a buffer memory or a cache of the storage device 200. For example, the buffer memory 240 may temporarily store data received from the host 11 or data output from the memory devices 211 to 213, or may temporarily store metadata (e.g., mapping tables) of the memory devices 211 to 213. The buffer memory 240 may include a volatile memory such as a DRAM or an SRAM and may be configured to have an input/output speed faster than an input/output speed of the memory devices 211 to 213.

According to at least another example embodiment of the inventive concepts, the memory devices 211 to 213, the controller 220, and the buffer memory 240 may be integrated in a single semiconductor device. According to at least one example embodiment of the inventive concepts, the memory devices 211 to 213, the controller 220, and the buffer memory 240 may be integrated in a single semiconductor device to constitute a solid state drive (SSD). The memory devices 211 to 213, the controller 220, and the buffer memory 240 may be integrated in a single semiconductor device to constitute a memory card. For example, the memory devices 211 to 213, the controller 220, and the buffer memory 240 may be integrated in a single semiconductor device to constitute a memory card such as a PC card (a personal computer memory card international association (PCMCIA) card), a compact flash card (CF), a smart media card (SM, SMC), a memory stick, a multimedia card (MMC, RS-MMC, MMCmicro, eMMC), an SD card (SD, miniSD, microSD, SDHC), or universal flash storage (UFS).

According to at least one example embodiment of the inventive concepts, the controller 220 may include or be implemented by one or more circuits or circuitry (e.g., hardware) specifically structured to carry out and/or control any or all of the operations described in the present disclosure as being performed by the controller 220 (or an element thereof). According to at least one example embodiment of the inventive concepts, the controller 220 may include or be implemented by a working memory and one or more processors executing computer-readable code (e.g., software and/or firmware) that is stored in the working memory and includes instructions for causing the one or more processors to carry out and/or control some or all of the operations described herein as being performed by the controller 220 (or an element thereof). According to at least one example embodiment of the inventive concepts, the controller 220 may be implemented by, for example, a combination of the above-referenced hardware and one or more processors executing computer-readable code.

Configurations of the host 11 and the first and second storage devices 12 and 15 described in FIG. 1 are described with reference to FIGS. 2 and 3. A multicast communication method between the host 11 and the first and second storage devices 12 and 15 will be described below.

Figure 4:
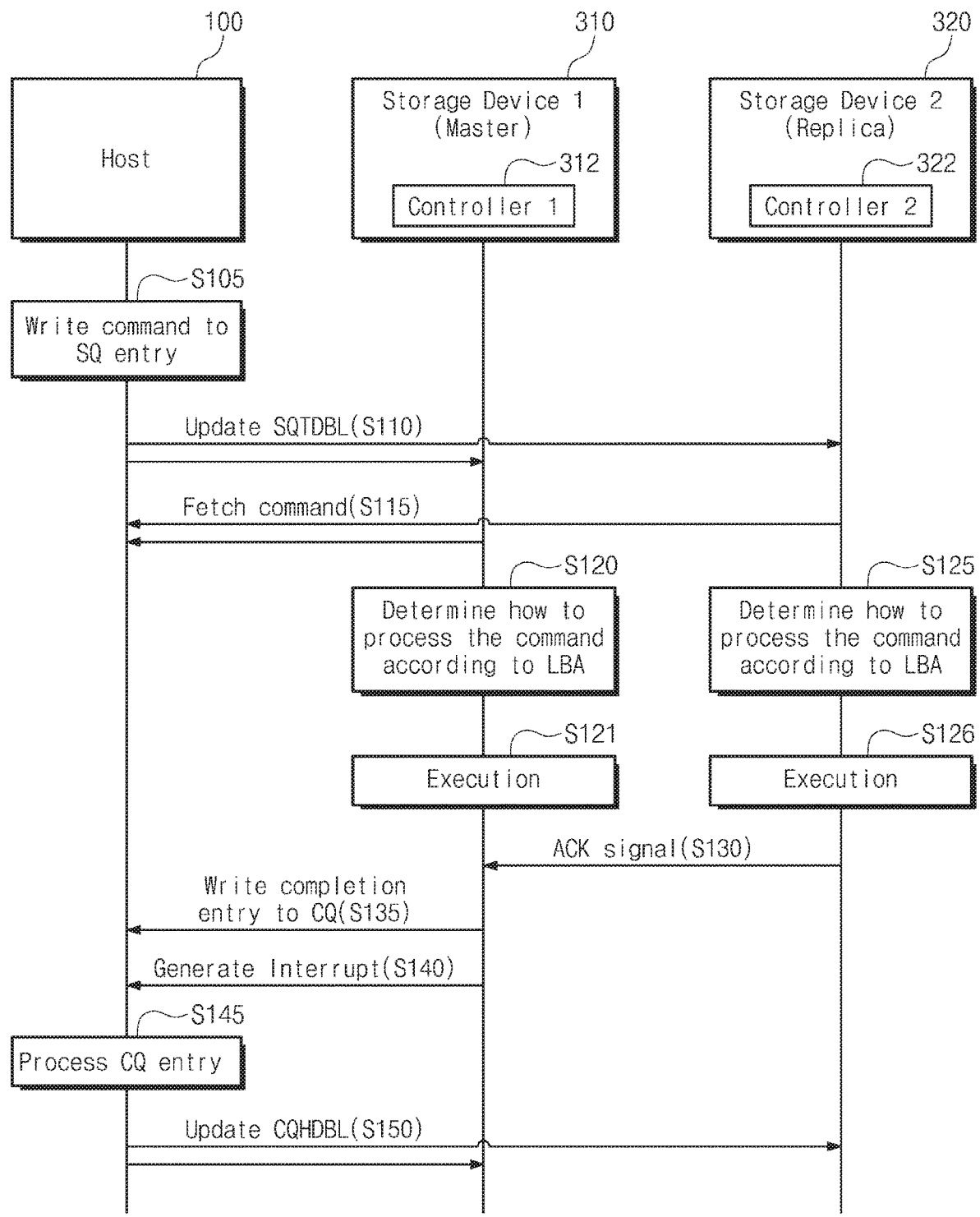
FIG. 4 is a flowchart illustrating a multicast communication method between the host and storage devices, according to at least some example embodiments of the inventive concepts.

FIG. 4 is a flowchart illustrating a multicast communication method between a host and storage devices, according to at least some example embodiments of the inventive concepts. FIG. 4 will be described with reference to FIGS. 1 to 3. In FIG. 4, it is assumed that a first storage device 310 is a master storage device and a second storage device 320 is a replica storage device. The first storage device 310 may include a first controller 312, and the second storage device 320 may include a second controller 322. Configurations of the first and second controllers 312 and 322 may be substantially the same as the configuration of the controller 220 of FIG. 3. Also, the first and second storage devices 310 and 320 may be separated and implemented or may be integrated and implemented in a single integrated device.

In operation S105, the host 100 may generate a command for storing data in the first and second storage devices 310 and 320 or reading data from the first and second storage devices 310 and 320 and may write the command in a submission queue (SQ) entry. The host 100 may update a tail pointer of a submission queue SQ allocated to the host memory 120.

In operation S110, the host 100 may update registers (e.g., the first register 223 of FIG. 3) of the first and second controllers 312 and 322, which store the submission queue tail doorbell SQTDBL, for notifying the first and second storage devices 310 and 320 that a new command is written in the submission queue SQ.

In operation S115, each of the first and second controllers 312 and 322 may fetch the submission queue entry. The first and second storage devices 310 and 320 may fetch a command that the host 100 generates, in parallel. Accordingly, the command that the host 100 generates may be transmitted to the first and second storage devices 310 and 320 in a multicasting manner. Afterwards, the first and second controllers 312 and 322 may process the fetched command in parallel.

According to at least one example embodiment of the inventive concepts, one or more submission queue entries may be sequentially fetched when a command is fetched by the first and second controllers 312 and 322. In more detail, the first and second controllers 312 and 322 may sequentially fetch commands stored from a submission queue head to a submission queue tail in order.

In operation S120 and operation S125, the first and second controllers 312 and 322 may respectively determine how to process the command, depending on a logical block address (LBA). The logical block address may be information included in the fetched command. The logical block address may indicate information about a location where data are stored and may be referred to as a "logical address".

Each of the first and second controllers 312 and 322 may determine its own role depending on a logical block address included in the command. Here, a role of a storage device may be classified as a role of a master storage device or a role of a replica storage device. As illustrated in FIG. 4, the first controller 312 may determine, as its own role, a role of a master storage device on the command fetched from the submission queue SQ, depending on a logical block address included in the fetched command. As in the above description, the second controller 322 may determine, as its own role, a role of a replica storage device on the command fetched from the submission queue SQ, depending on a logical block address included in the fetched command. An operation in which a controller determines a role by using a logical block address will be described with reference to table 1.

In operation S121 and operation S126, the first and second controllers 312 and 322 may respectively execute an operation corresponding to the fetched command depending on the logical block address and may process the fetched command. For example, if the fetched command is a write command, each of the first and second controllers 312 and 322 may store data provided from the host 100 in a memory device. For example, if the fetched command is a read command, each of the first and second controllers 312 and 322 may read data requested by the host 100 from the memory devices 211 to 213 (refer to FIG. 3). Commands stored in the submission queue SQ may be processed in a fetched order or may not be processed in a fetched order.

In operation S130, the second controller 322 may transmit an acknowledgment signal to the first controller 312. In this case, the acknowledgment signal may indicate that the command that the host 100 generates is processed by the second storage device 320 or the second controller 322. The first controller 312 may receive the acknowledgment signal from the second controller 322 and may determine that command processing of a replica storage device (e.g., the second storage device 320) is completed. That is, through operation S130, the first controller 312 may determine that the command that the host 100 generates is processed by the first and second storage devices 310 and 320.

In operation S135, the first controller 312 may write a completion queue entry or completion information for notifying completion of the command fetched from the submission queue SQ. The collision event that the first and second controllers 312 and 322 access the completion queue CQ at the same time may not occur in operation S135. If the acknowledgment signal is received in operation S130, the first controller 312 may transmit completion information of the fetched command to the host 100. Since the second storage device 320 is a replica storage device, the second controller 322 may not access the completion queue CQ. According to at least one example embodiment of the inventive concepts, the completion queue entry may be 16 bytes in size and may include a submission queue identifier SQID, a submission queue head pointer SQHD, a status field SF, a phase tag P, a command identifier CID, etc.

According to at least some example embodiments of the inventive concepts, only a controller (the first controller 312) of a master storage device may access the completion queue CQ. Accordingly, the first controller 312 may access the completion queue CQ, while the second controller 322 may not access the completion queue CQ. Accordingly, even though the host 100 multicasts a command, the collision event that the first and second controllers 312 and 322 access the completion queue CQ at the same time may not occur.

In operation S140, the first controller 312 may generate an interrupt and may transmit the interrupt to the host 100. The interrupt may be a pin-based signal or may be transmitted in a message signaled interrupt (MSI) manner or an MSI-X manner.

In operation S145, the host 100 may receive the interrupt from the first controller 312 and may process a completion queue entry or completion information. In more detail, the host 100 may perform an interrupt service routine. If a command requested to the first and second storage devices 310 and 320 is normally processed, the host 100 may newly generate a next command associated with the completed command. However, in the case where the requested command is not normally processed, the host 100 may again generate a command or may perform an operation of recovering an error.

In operation S150, the host 100 may update registers (e.g., the second register 224 of FIG. 3) of the first and second controllers 312 and 322, which store the completion queue head doorbell CQHDB, for notifying the first and second storage devices 310 and 320 that the completion queue entry or completion information is processed.

According to at least one example embodiment of the inventive concepts, unlike illustration, depending on a logical block address of a command, the first storage device 310 may be a replica storage device, and the second storage device 320 may be a master storage device. In this case, operation S130 may be performed by the first controller 312, and operation S135 and operation S140 may be performed by the second controller 322. Also, the second controller 322 may access the completion queue CQ, while the first controller 312 may not access the completion queue CQ.

Figure 5:
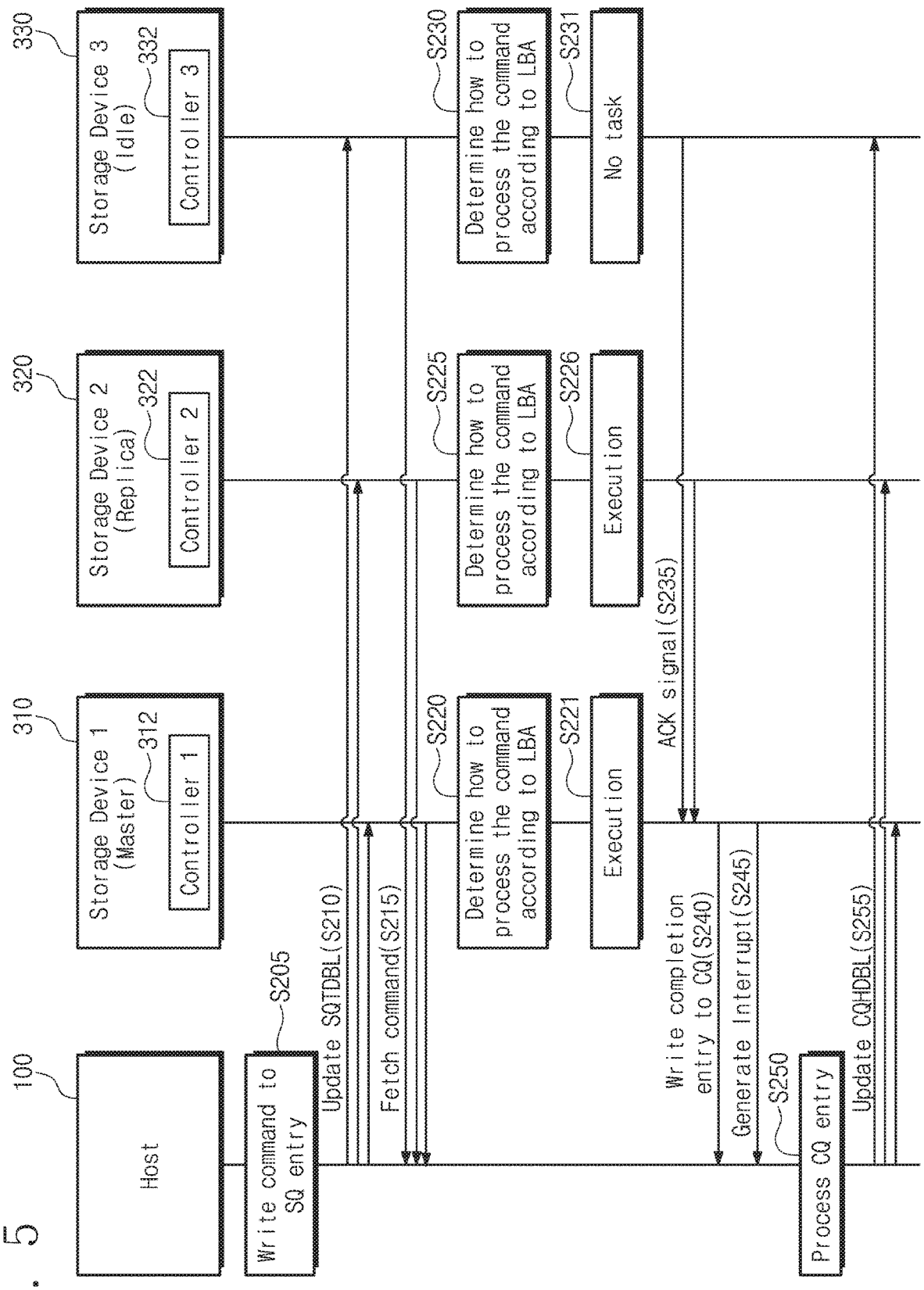
FIG. 5 is a flowchart illustrating a multicast communication method between the host and the storage devices, according to at least some example embodiments of the inventive concepts.

FIG. 5 is a flowchart illustrating a multicast communication method between a host and storage devices, according to at least some example embodiments of the inventive concepts. FIG. 5 will be described with reference to FIGS. 1 to 4. Referring to FIG. 5, the host 100 may further multicast a command to a third storage device 330 as well as the first and second storage devices 310 and 320. In FIG. 5, it is assumed that the first storage device 310 is a master storage device, the second storage device 320 is a replica storage device, and the third storage device 330 is an idle storage device. The idle storage device may refer to a device that does not perform any task on a corresponding command. A role of a storage device may further include a role of the idle storage device.

The first storage device 310 may include the first controller 312, the second storage device 320 may include the second controller 322, and the third storage device 330 may include a third controller 332. Configurations of the first, second, and third controllers 312, 322, and 332 may be substantially the same as the configuration of the controller 220 of FIG. 3. Also, the first to third storage devices 310 to 330 may be separated and implemented, or may be integrated and implemented in a single integrated circuit.

Operation S205 to operation S215 are substantially the same as operation S105 to operation S115 of FIG. 4. However, the host 100 may further update a register (e.g., the first register 223 of FIG. 3) of the third controller 332, which stores the submission queue tail doorbell SQTDBL, and the third controller 332 may fetch a submission queue entry.

Operation S220 and operation S225 are substantially the same as operation S120 and operation S125 of FIG. 4. In operation S230, the third controller 332 may determine how to process a command depending on a logical block address. As illustrated in FIG. 5, the third controller 332 may determine, as its own role, a role of an idle storage device on the command fetched from the submission queue SQ, depending on a logical block address included in the fetched command. For example, each of the first, second, and third controllers 312, 322, and 332 may determine whether to perform an operation or task corresponding to a command, depending on a logical block address.

Operation S221 and operation S226 are substantially the same as operation S121 and operation S126 of FIG. 4. In operation S231, the third controller 332 may not perform any task on the fetched command.

In operation S235, the second controller 322 may transmit an acknowledgment signal to the first controller 312. Also, the third controller 332 may transmit an acknowledgment signal to the first controller 312. Since there is no role assigned to the third controller 332 with regard to the fetched command, the third controller 332 may not perform an operation corresponding to the fetched command. The third controller 332 may not perform an operation corresponding to the fetched command and may transmit an acknowledgment signal indicating that the fetched command is processed, to the first controller 312.

The first controller 312 may receive the acknowledgment signals form the second and third controllers 322 and 332, and may determine that command processing of storage devices fetching a command from the host 100 is completed. One replica storage device and one idle storage device are illustrated in FIG. 5. However, at least some example embodiments of the inventive concepts may not be limited thereto. For example, the host 100 may multicast a command to storage devices, the number of which is more than illustrated. The first controller 312 may receive acknowledgment signals from storage devices fetching a command from the host 100 and may count the number of the received acknowledgment signals. The first controller 312 may determine whether the command of the host 100 is processed, based on the counting result.

Operation S240 to operation S255 are substantially the same as operation S135 to operation S150 of FIG. 4. The collision event that the first to third controllers 312, 322, and 332 access the completion queue CQ at the same time may not occur in operation S240. The host 100 may further update a register (e.g., the second register 224 of FIG. 3) of the third controllers 332, which stores the completion queue head doorbell CQHDBL, for notifying the third storage device 330 that the completion queue entry or completion information is processed.

According to at least one example embodiment of the inventive concepts, unlike illustration, depending on a logical block address of a command generated by the host 100, the first storage device 310 may be a replica storage device or an idle storage device, the second storage device 320 may be a master storage device or an idle storage device, and the third storage device 330 may be a master storage device or a replica storage device.

Figure 6:
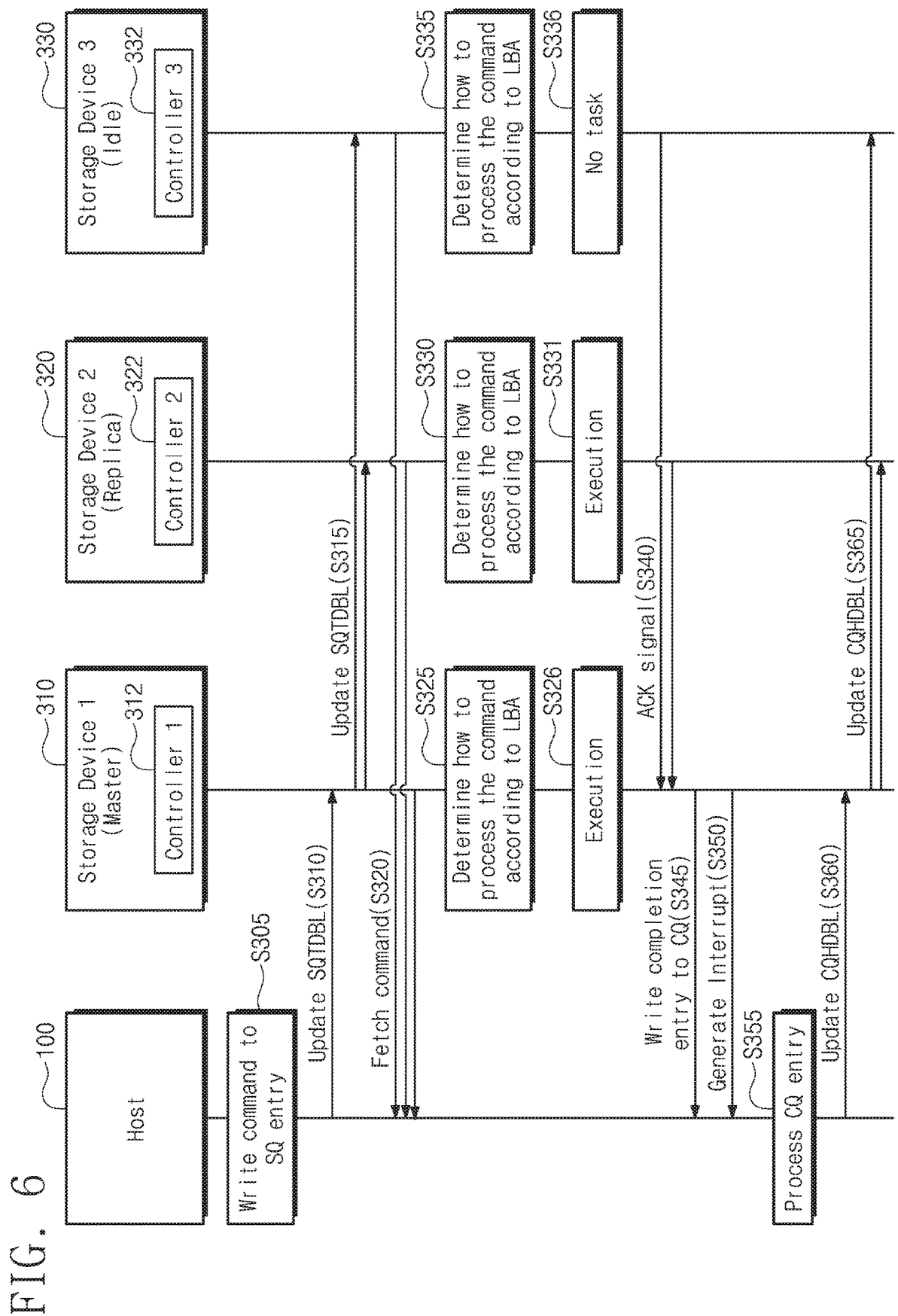
FIG. 6 is a flowchart illustrating a multicast communication method between the host and the storage devices, according to at least some example embodiments of the inventive concepts.

FIG. 6 is a flowchart illustrating a multicast communication method between a host and storage devices, according to at least some example embodiments of the inventive concepts. FIG. 6 will be described with reference to FIGS. 1 to 5. Operation S305 and operation S320 to operation S355 are substantially the same as operation S205 and operation S215 to operation S250 of FIG. 5. A difference between FIGS. 5 and 6 will be described below.

In operation S310, the host 100 may update only a register of the first controller 312 without updating registers of the second and third controllers 322 and 332, which store the submission queue tail doorbell SQTDBL, for notifying the first to third storage devices 310 to 330 that a new command is written in the submission queue SQ.

In operation S315, the first controller 312 may update registers of the second and third controllers 322 and 332. The first controller 312 may provide the registers of the second and third controllers 322 and 332 with a new submission queue tail doorbell updated by the host 100. That is, the first controller 312 may transmit information of a new submission queue to the second and third storage devices 320 and 330 instead of the host 100.

In operation S360, to notify the first to third storage devices 310 to 330 that the completion queue entry or completion information is processed, the host 100 may update only a register of the first controller 312 without updating registers of the second and third controllers 322 and 332, which store the completion queue head doorbell CQHDBL.

In operation S365, the first controller 312 may update the registers of the second and third controllers 322 and 332 instead of the host 100. The first controller 312 may provide the registers of the second and third controllers 322 and 332 with a new completion queue head doorbell updated by the host 100. That is, the first controller 312 may transmit information of a new completion queue to the second and third storage devices 320 and 330.

The first, second, and third controllers 312, 322, and 332 may fetch a command from the submission queue SQ in parallel regardless of a manner illustrated in FIG. 5 or a manner illustrated in FIG. 6. Even though the host 100 updates only the register of the first controller 312, the first, second, and third controllers 312, 322, and 332 may fetch a command of the submission queue SQ.

TABLE 1

| LBA | MOD 3 | Storage Device (310) | Storage Device (320) | Storage Device (330) |
|---|---|---|---|---|
| 0 | 0 | Master | Replica | No Task (Idle) |
| 1 | 1 | No Task (Idle) | Master | Replica |
| 2 | 2 | Replica | No Task (Idle) | Master |
| 3 | 0 | Master | Replica | No Task (Idle) |
| 4 | 1 | No Task (Idle) | Master | Replica |

Table 1 shows results that controllers of storage devices according to at least some example embodiments of the inventive concepts determine roles for data according to a logical block address. Table 1 will be described with reference to FIGS. 4 to 6. Table 1 shows results of operation S120 and operation S125 of FIG. 4, results of operation S220, S225, and S230 of FIG. 5, and results of operation S325, S330, and S335 of FIG. 6.

Each of the first, second, and third controllers 312, 322, and 332 may perform a modulo-N operation on a logical block address of a fetched command. "N" may be determined based on the number of controllers fetching a command or the number of storage devices communicating with a host according to a multicast communication protocol. In table 1, for example, it is assumed that "N" is "3" indicating the number of controllers.

Referring to table 1, the first controller 312 may perform a role of a master storage device on data if the remainder of the modulo operation is "0", may perform a role of an idle storage device on data if the remainder of the modulo operation is "1", and may perform a role of a replica storage device on data if the remainder of the modulo operation is "2". Roles of the second and third controllers 322 and 332 may be determined in a manner similar to the first controller 312.

From the point of view of data, for data which the logical block address is "0", the first controller 312 may store or copy the data as a master storage device, and the second controller 322 may store, copy, or back up the data as a replica storage device. In contrast, the third controller 332 may not perform any task on the data which the logical block address is "0". For data having another logical block address, the roles of the first to third storage devices 310 to 330 may be determined in a manner similar to the above-described manner.

From the point of view of the first controller 312, the first controller 312 may in advance store a first setting value "0", a second setting value "1", and a third setting value "2". The first to third setting values "0", "1", and "2" may be stored in the memory devices 211 to 213, the buffer memory 240, or an internal register (not illustrated) of the controller 220 of FIG. 3. The first to third setting values "0", "1", and "2" may be values determined in advance and may be shared by the second and third storage devices 320 and 330 through the storage device interface circuit 226 of FIG. 3.

If the remainder of the modulo operation matches with the first setting value "0", the first controller 312 may operate as a master storage device for a command. For example, if the remainder of the modulo operation matches with the first setting value "0", the first controller 312 may process a command (operation S121, operation S221, and operation S326) and may receive an acknowledgment signal from the second controller 322 (operation S130, operation S235, and operation S340).

If the remainder of the modulo operation matches with the second setting value "1", the first controller 312 may operate as an idle storage device for a command. For example, if the remainder of the modulo operation matches with the second setting value "1", the first controller 312 may not perform any operation on a command (operation S231 and operation S336) and may transmit an acknowledgment signal to a master storage device (operation S235 and operation S340).

If the remainder of the modulo operation matches with the third setting value "2", the first controller 312 may operate as a replica storage device for a command. For example, if the remainder of the modulo operation matches with the third setting value "2", the first controller 312 may process a command (operation S126, operation S226, and operation S331) and may transmit an acknowledgment signal to a master storage device (operation S130, operation S235, and operation S340).

According to at least one example embodiment of the inventive concepts, setting values stored in each of the first, second, and third controllers 312, 322, and 332 may be fixed values. According to at least another example embodiment of the inventive concepts, the setting values may be dynamically changed. For example, the setting values stored in each of the first, second, and third controllers 312, 322, and 332 may be changed to adjust load balance of the first, second, and third controllers 312, 322, and 332.

Figure 7:
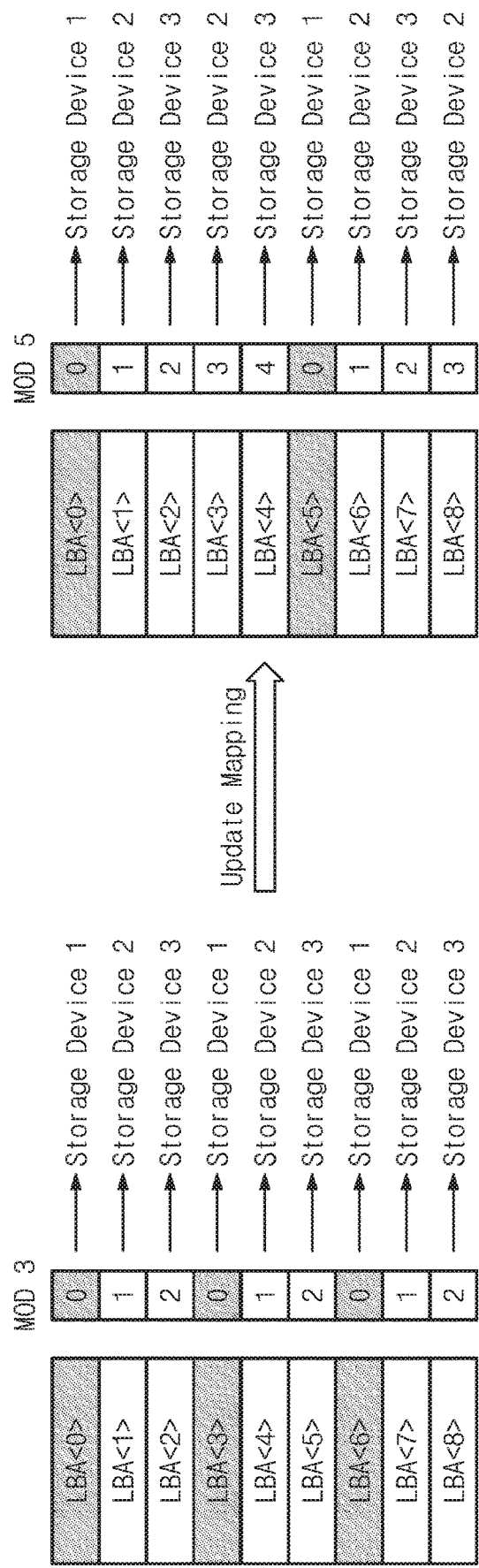
FIG. 7 is a view illustrating a change of master devices with respect to data according to a change in setting values of a controller according to at least some example embodiments of the inventive concepts.

FIG. 7 is a view illustrating a change of master devices for data according to a change in setting values of a controller according to at least some example embodiments of the inventive concepts. FIG. 7 will be described with reference to FIGS. 5 and 6 and table 1. On the left side of FIG. 7, the first storage device 310 may operate as a master storage device for data in which the remainder of a modulo-3 operation is "0", the second storage device 320 may operate as a master storage device for data in which the remainder of the modulo-3 operation is "1", and the third storage device 330 may operate as a master storage device for data in which the remainder of the modulo-3 operation is "2".

Afterwards, in the case of reducing a load of the first storage device 310 due to an increase in load of the first storage device 310, the first, second, and third controllers 312, 322, and 332 may communicate with each other to change a manner of a modulo operation. For example, each of the first, second, and third controllers 312, 322, and 332 may perform a modulo-5 operation. The first storage device 310 may operate as a master storage device if the remainder of the modulo-5 operation is "0", the second storage device 320 may operate as a master storage device if the remainder of the modulo-5 operation is "1" or "3", and the third storage device 330 may operate as a master storage device if the remainder of the modulo-5 operation is "2" or "4".

Referring to the right side of FIG. 7, as a mapping relationship of a master storage device for data is updated, the load of the first storage device 310 may decrease. That is, the first, second, and third controllers 312, 322, and 332 may communicate with each other to change setting values, a manner of a modulo operation, etc. The host 100 may not participate in such a change process.

Figure 8:
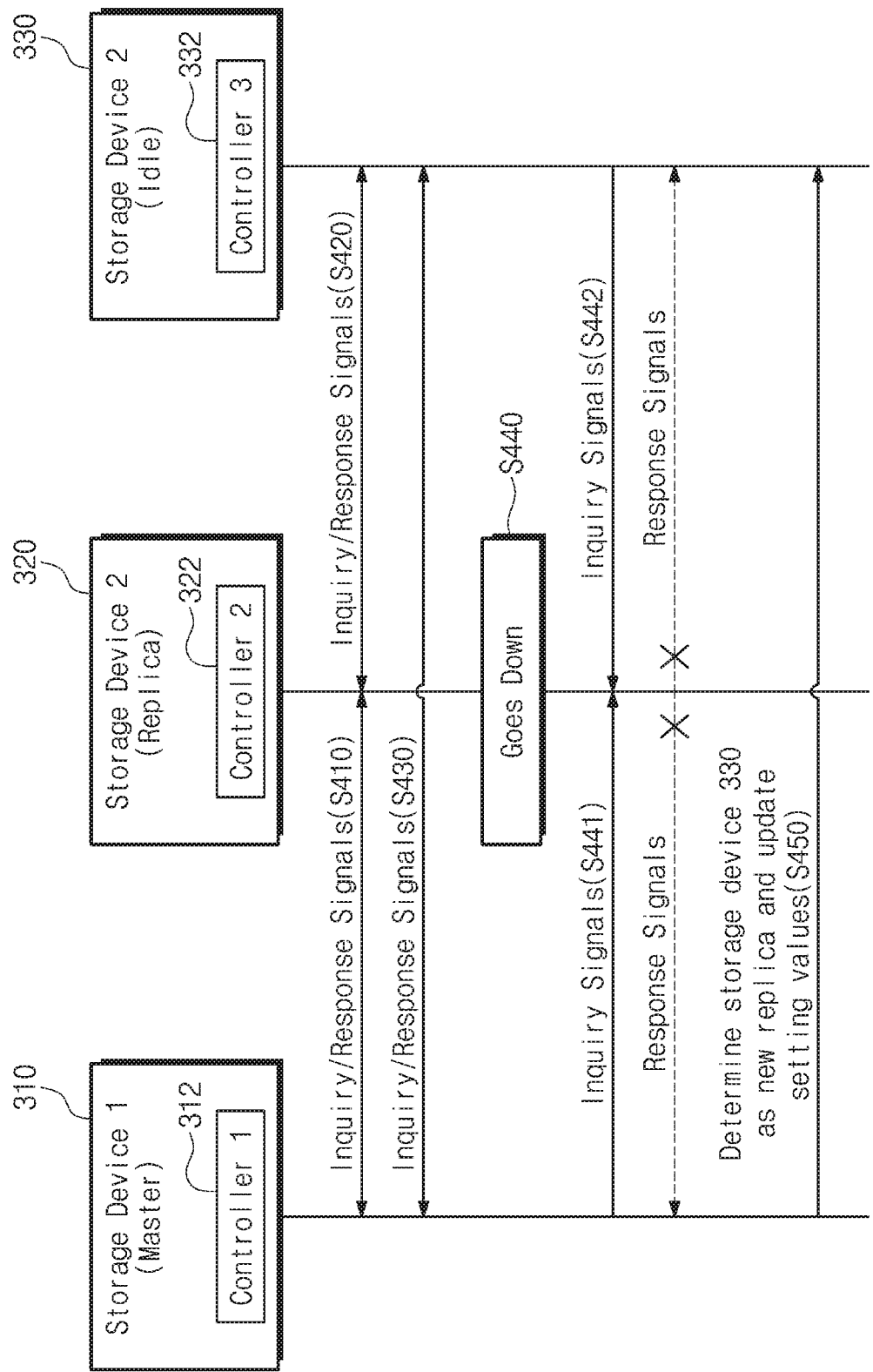
FIG. 8 is a flowchart illustrating a process of determining a new replica storage device when an operation of a second storage device operating as a replica storage device of first to third storage devices goes down.

FIG. 8 is a flowchart illustrating a process of determining a new replica storage device when an operation of a second storage device operating as a replica storage device of first to third storage devices goes down. FIG. 8 will be described with reference to FIG. 5.

In operation S410, operation S420, and operation S430, the first, second, and third controllers 312, 322, and 332 may exchange inquiry signals and response signals with each other. As described above, an inquiry signal may be a signal for determining whether an operation of any other storage device goes down or whether a fault occurs, and a response signal may be a signal transmitted as a response from a storage device receiving the inquiry signal. Operation S410, operation S420, and operation S430 may be performed by the fault recognition modules 228 (refer to FIG. 3) of the first, second, and third controllers 312, 322, and 332.

In operation S440, an operation of the second storage device 320 may go down due to any other cause. For example, the operation of the second storage device 320 may go down due to various causes such as collision with any other storage device, external impact, unstable power, lifespan, etc. In this case, the second storage device 320 may not generate response signals to inquiry signals of the first and third controllers 312 and 332. Accordingly, in response to failing to receive response signals from the second storage device 320 in response to inquiry signals send from the first and third controllers 312 and 332, the first and third controllers 312 and 332 may determine that the operation of the second storage device 320 has gone down.

In operation S450, the first controller 312 may determine the third storage device 330 as a new replica storage device and may newly update the above-described setting values. Unlike illustration, if the number of idle storage devices is 2 or more, the first controller 312 may determine any one of the idle storage devices as a new replica storage device. For example, the first controller 312 may determine a storage device, the load of which is relatively small, from among the two or more idle storage devices as a new replica storage device.

Figure 9:
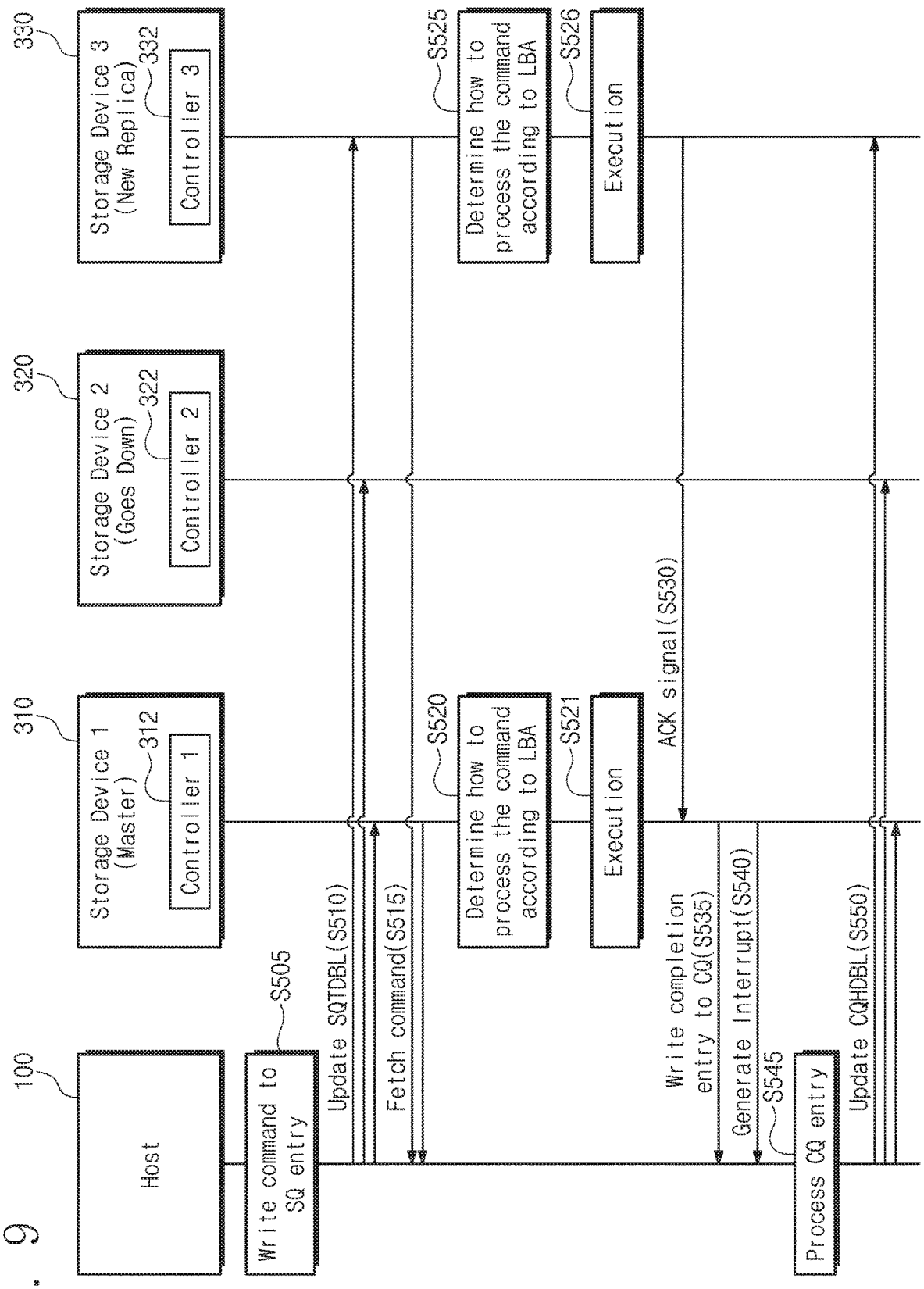
FIG. 9 is a flowchart illustrating a multicast communication method between the host and the storage devices after a first controller determines the third storage device as a new replica storage device.

FIG. 9 is a flowchart illustrating a multicast communication method between a host and storage devices after a first controller determines a third storage device as a new replica storage device. FIG. 9 will be described with reference to FIGS. 5 and 8. In FIG. 9, an operation of the second storage device 320 goes down (refer to operation S440).

Operation S505 to operation S515 are substantially the same as operation S205 to operation S215 of FIG. 5. However, since the operation of the second storage device 320 goes down, in operation S515, the second controller 322 may fail to fetch a command from the submission queue SQ.

Operation S520 and operation S521 are substantially the same as operation S220 and operation S221 of FIG. 5. The third storage device 330 may perform operation S525 and operation S526 as a new replica storage device. Operation S525 and operation S526 are substantially the same as operation S225 and operation S226 of FIG. 5.

In operation S440 (refer to FIG. 8), if the fault recognition module 228 of the first controller 312 determines that the operation of the second storage device 320 goes down, in operation S530, the first controller 312 may receive an acknowledgment signal indicating that a command is processed by the third storage device 330, from the third storage device 330 fetching the command from the host 100. Afterwards, operation S535 to operation S550 are substantially the same as operation S240 to operation S255 of FIG. 5.

Figure 10:
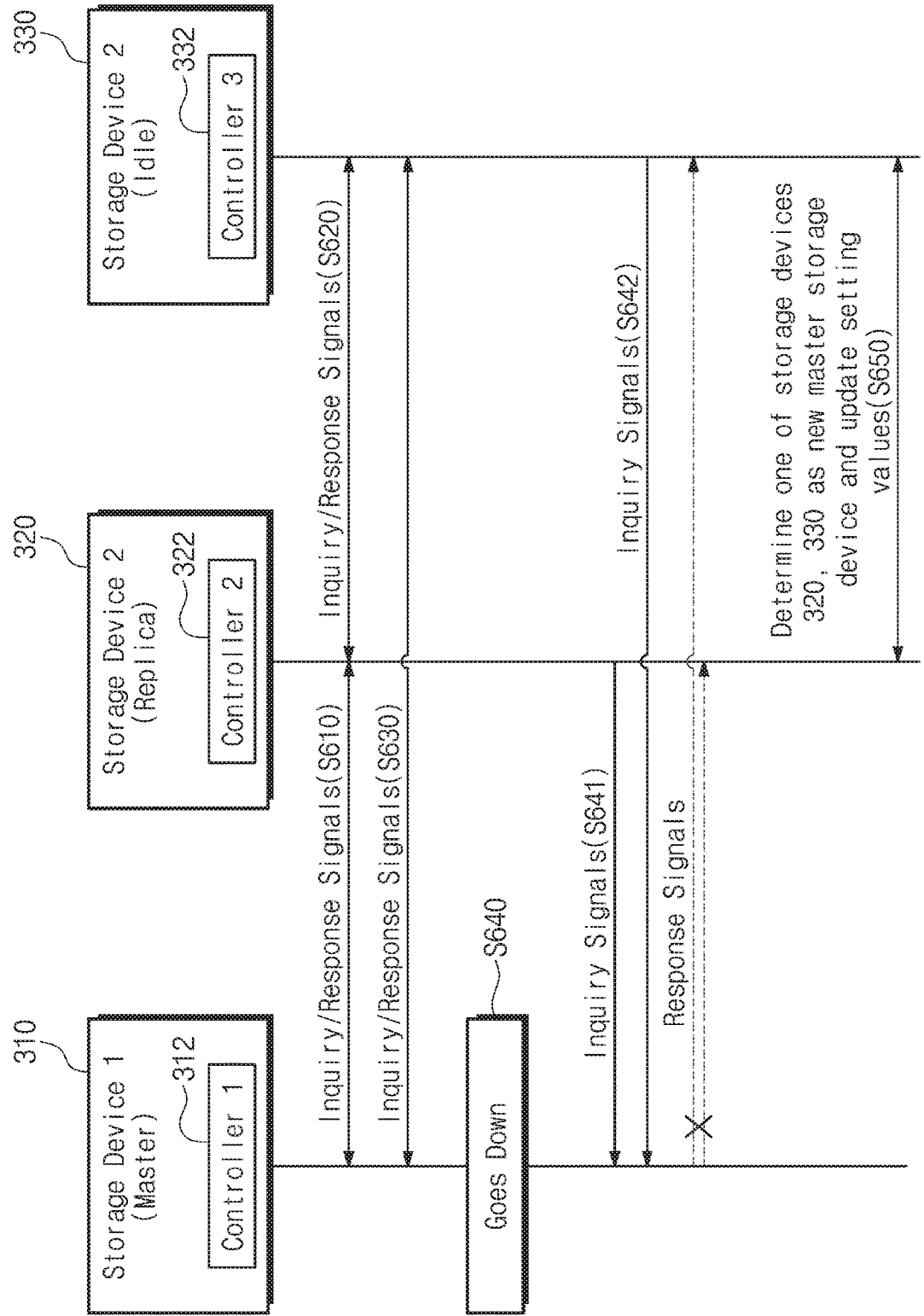
FIG. 10 is a flowchart illustrating a process of determining a new master storage device when an operation of the first storage device operating as a master storage device of the first to third storage devices goes down.

FIG. 10 is a flowchart illustrating a process of determining a new master storage device when an operation of a first storage device operating as a master storage device of first to third storage devices goes down. FIG. 10 will be described with reference to FIGS. 5 and 8.

Operation S610 to operation S630 are substantially the same as operation S410 to operation S430 of FIG. 8. In operation S640, an operation of the first storage device 310 may go down due to any other cause. In this case, the first storage device 310 may not generate response signals to inquiry signals of the second and third controllers 322 and 332. Accordingly, the second and third controllers 322 and 332 may determine that the operation of the first storage device 310 operating as a master storage device goes down.

In operation S650, the second and third controllers 322 and 332 may determine any one of the second and third storage devices 320 and 330 as a new master storage device and may newly update the above-described setting values. For example, a storage device, the load of which is relatively small, from among the second and third storage devices 320 and 330 may be determined as a new master storage device. The other of the second and third storage devices 320 and 330 may be determined a new replica storage device.

Figure 11:
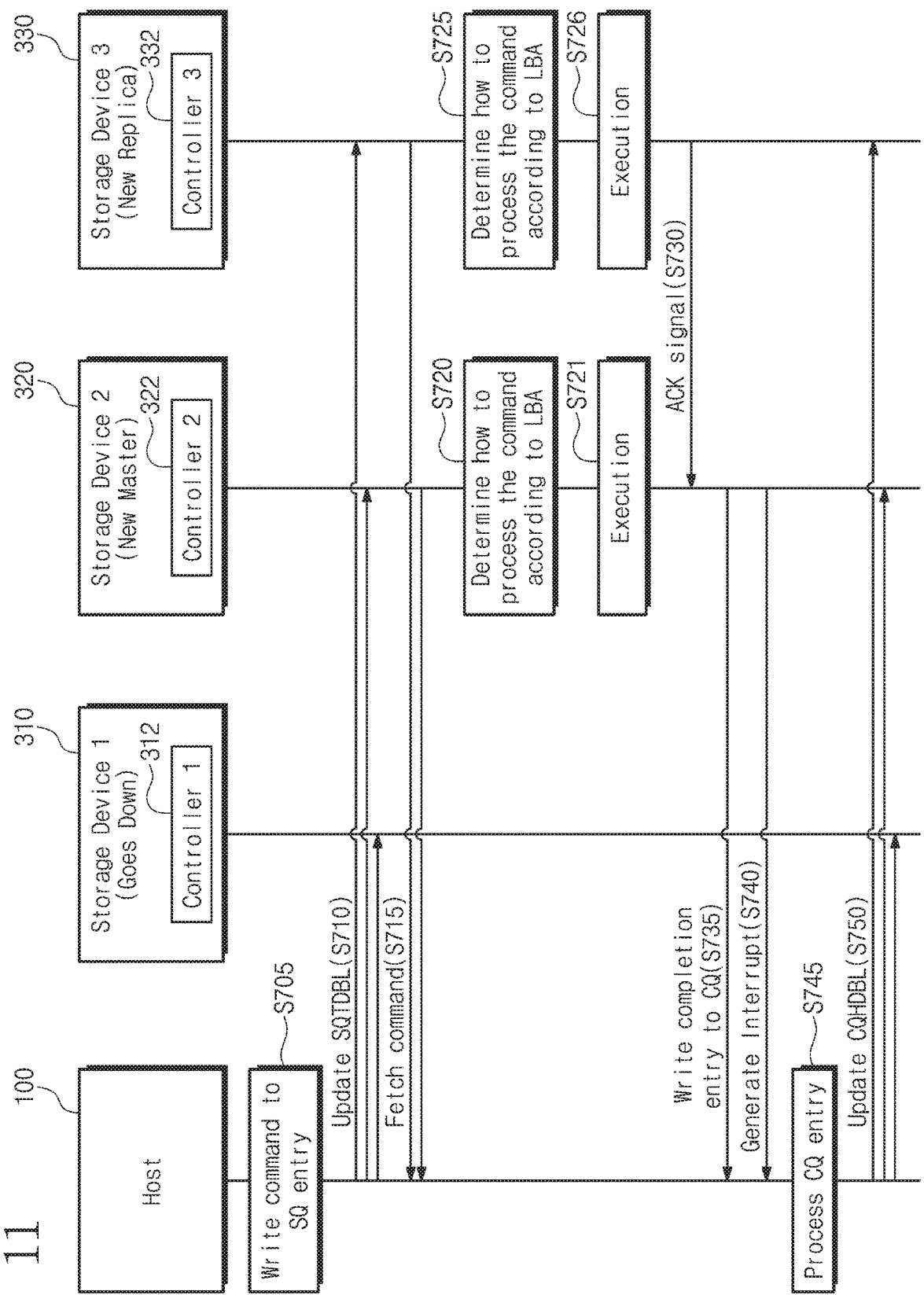
FIG. 11 is a flowchart illustrating a multicast communication method between a host and storage devices after second and third controllers determine a second storage device as a new master storage device.

FIG. 11 is a flowchart illustrating a multicast communication method between a host and storage devices after second and third controllers determine a second storage device as a new master storage device. FIG. 11 will be described with reference to FIGS. 5 and 10. In FIG. 11, an operation of the first storage device 310 may go down (refer to operation S640), the second storage device 320 may be determined as a new master storage device by the second and third controllers 322 and 332, and the third storage device 330 may be determined as a new replica storage device thereby.

Operation S705 to operation S715 are substantially the same as operation S205 to operation S215 of FIG. 5. However, since the operation of the first storage device 310 goes down, in operation S715, the first controller 312 may fail to fetch a command from the submission queue SQ.

The second storage device 320 may perform operation S720 and operation S721 as a new master storage device. Operation S720 and operation S721 are substantially the same as operation S220 and operation S221 of FIG. 5. The third storage device 330 may perform operation S725 and operation S726 as a new replica storage device. Operation S725 and operation S726 may be substantially the same as operation S225 and operation S226 of FIG. 5.

In operation S640 (refer to FIG. 10), if the fault recognition module 228 of the second controller 322 determines that the operation of the first storage device 310 goes down, in operation S730, the second controller 322 may receive an acknowledgment signal indicating that a command is processed by the third storage device 330, from the third storage device 330 fetching the command from the host 100. Also, if the fault recognition module 228 of the third controller 332 determines that the operation of the first storage device 310 goes down, the third controller 332 may transmit an acknowledgment signal to the second storage device 320 (a previous replica storage device and a current master storage device) fetching a command of the host 100. Afterwards, operation S735 to operation S750 may be substantially the same as operation S240 to operation S255 of FIG. 5.

According to at least another example embodiment of the inventive concepts, the third storage device 330 may be determined as a new master storage device, and the second storage device 320 may operate as a replica storage device without change. In this case, the third controller 332 may perform operation S720 and operation S721, and the second controller 322 may perform operation S725 and operation S726.

Figure 12:
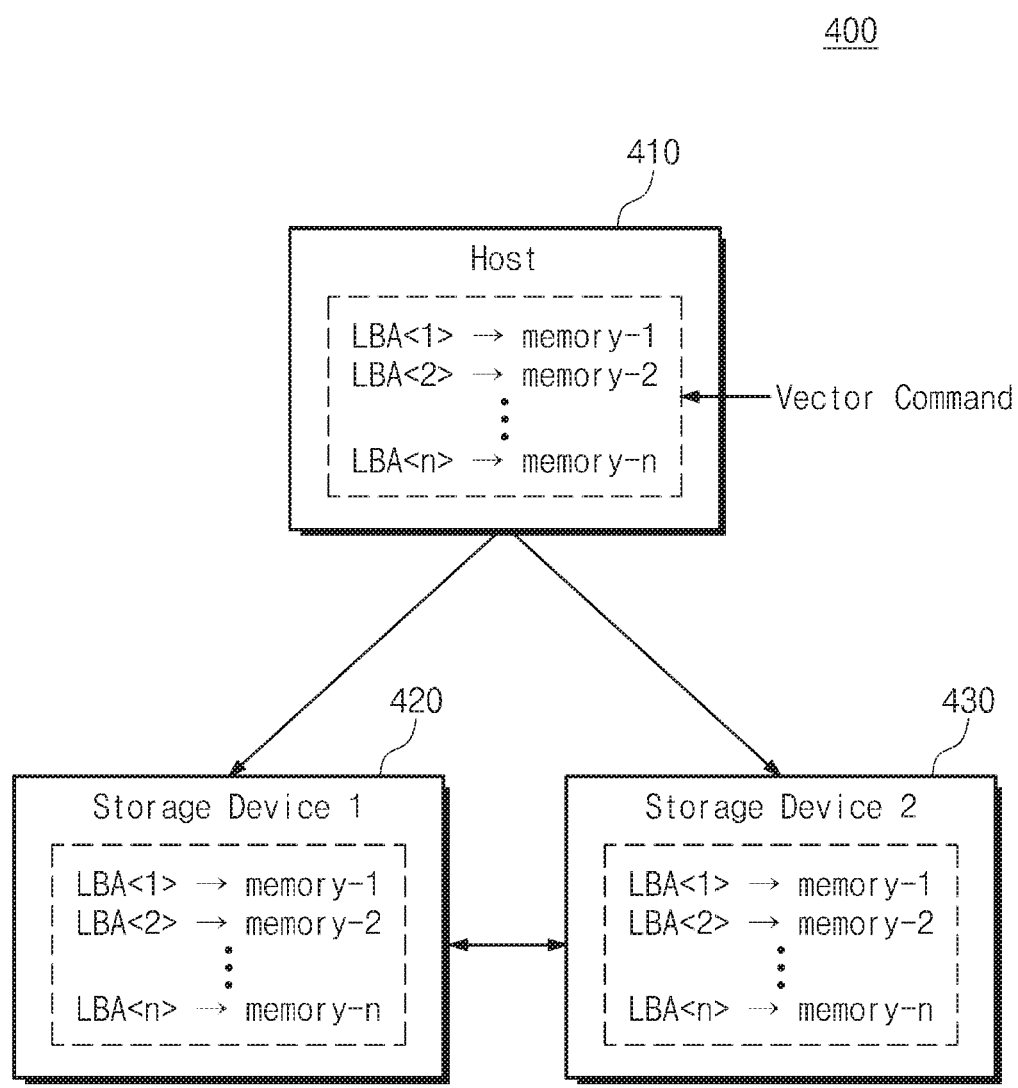
FIG. 12 is a view illustrating that a vector command is transmitted from the host to the storage devices depending on a multicast communication protocol according to at least some example embodiments of the inventive concepts.

FIG. 12 is a view illustrating that a vector command is transmitted from a host to storage devices depending on a multicast communication protocol according to at least some example embodiments of the inventive concepts. Referring to FIG. 12, a storage system 400 may include a host 410 and first and second storage devices 420 and 430. The host 410 may transmit a vector command to the first and second storage devices 420 and 430 depending on the above-described multicast communication method.

The vector command may be a list or a set of commands as illustrated in FIG. 12. A logical block address may be allocated to each command, and a memory block of a memory device may be specified by the logical block address. The first and second storage devices 420 and 430 may respectively fetch a vector command generated by a host in parallel depending on the multicast communication methods of FIGS. 4 to 11 and may process the vector command.

Figure 13:
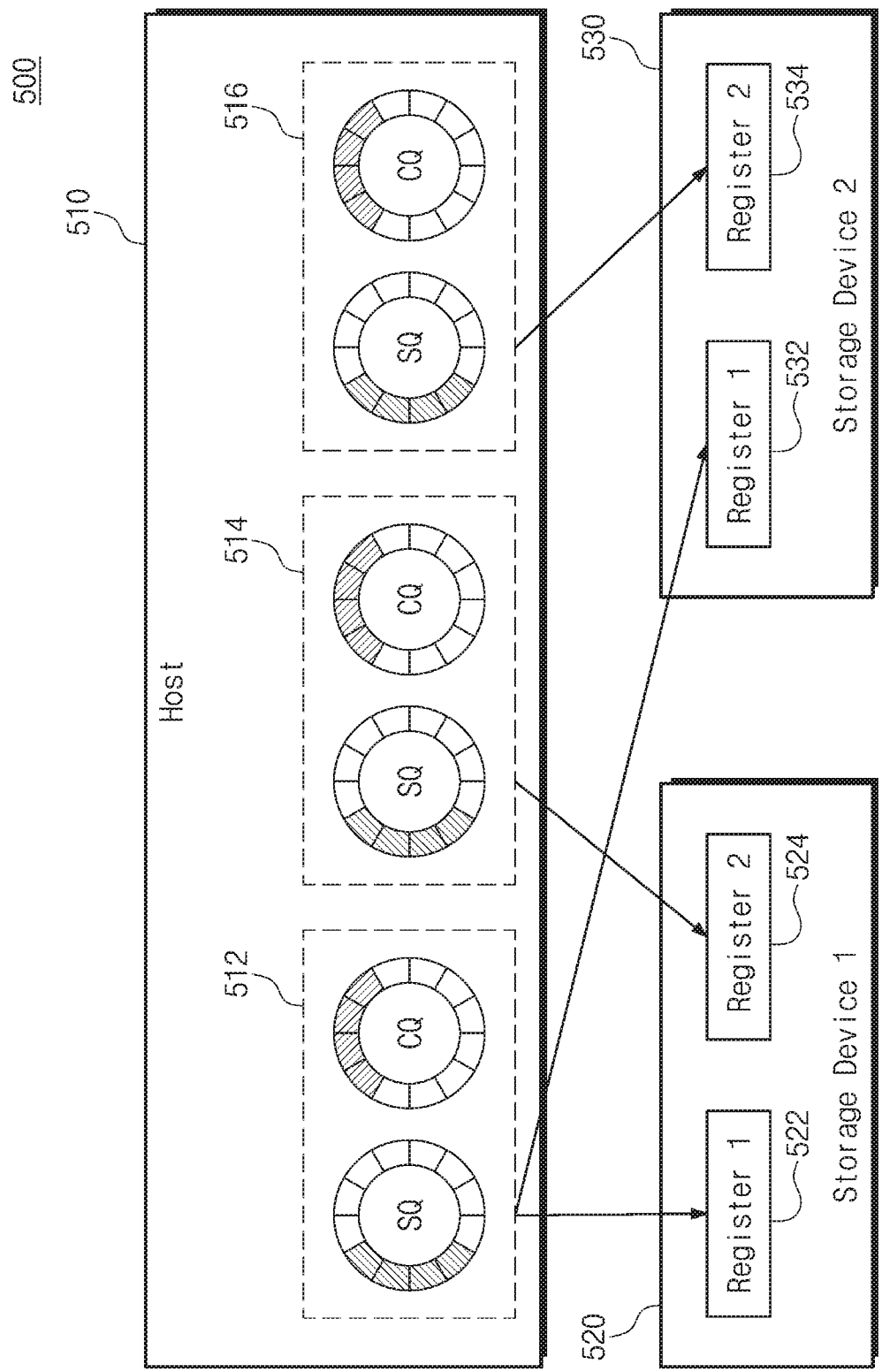
FIG. 13 is a block diagram illustrating the storage system according to at least another example embodiment of the inventive concepts.

FIG. 13 is a block diagram illustrating a storage system according to at least some example embodiments of the inventive concepts. Referring to FIG. 13, a storage system 500 may include a host 510 and first and second storage devices 520 and 530. The host 510 may include a first pair 512, a second pair 514, and a third pair 516.

The first pair 512 may be accessed by the first and second storage devices 520 and 530. In more detail, the first and second storage devices 520 and 530 may fetch a command from the submission queue SQ of the first pair 512, and a master storage device of the first and second storage devices 520 and 530 may write completion information in the completion queue CQ of the first pair 512. The first pair 512 may be shared by the first and second storage devices 520 and 530. The first storage device 520 may include a first register 522, and the second storage device 530 may include a first register 532 so that a submission queue tail doorbell of the first pair 512 may be respectively written in the first registers 522 and 532 by the host 510.

The second pair 514 may be accessed by the first storage device 520. The second pair 514 may be a queue dedicated for the first storage device 520. According to at least some example embodiments of the inventive concepts, the second pair 514 may be accessed only by the first storage device 520, and not by the second storage device 530. The first storage device 520 may include a second register 524 so that a submission queue tail doorbell of the second pair 514 may be written in the second register 524 by the host 510.

The third pair 516 may be accessed by the second storage device 530. The third pair 516 may be a queue dedicated for the second storage device 530. According to at least some example embodiments of the inventive concepts, the third pair 516 may be accessed only by the second storage device 530, and not by the first storage device 520. The second storage device 530 may include a second register 534 so that a submission queue tail doorbell of the third pair 516 may be written in the second register 534 by the host 510.

That is, the host 510 may further include a dedicated queue (the second pair 514) for the first storage device 520 and a dedicated queue (the third pair 516) for the second storage device 530, as well as a sharing queue (the first pair 512) for the first and second storage devices 520 and 530.

Figure 14:
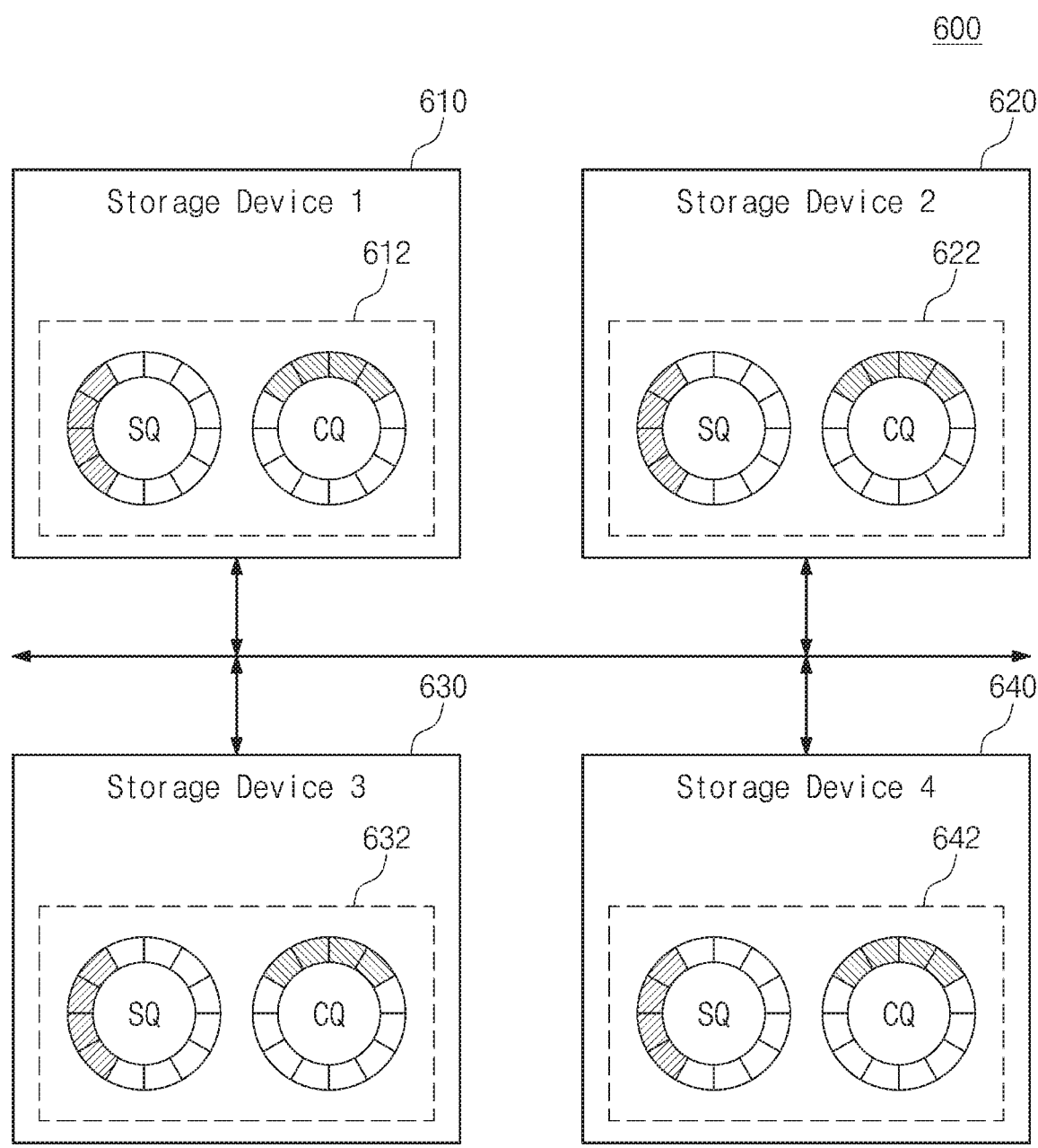
FIG. 14 is a view illustrating the computing system according to at least some example embodiments of the inventive concepts.

FIG. 14 is a view illustrating a computing system according to at least another example embodiment of the inventive concepts. Referring to FIG. 14, a storage system 600 may include first to fourth storage devices 610 to 640. The first to fourth storage devices 610 to 640 may communicate with each other according to a multicast communication protocol according to at least some example embodiments of the inventive concepts. That is, each of the first to fourth storage devices 610 to 640 may perform an operation of the host 100 described with reference to FIGS. 1 to 11. Here, the first to fourth storage devices 610 to 640 may be separated and implemented or may be integrated and implemented in a single integrated circuit.

The first storage device 610 may include a first pair 612, the second storage device 620 may include a second pair 622, the third storage device 630 may include a third pair 632, and the fourth storage device 640 may include a fourth pair 642. As in the first pair 512 of FIG. 13, the first, second, third, and fourth pairs 612, 622, 632, and 642 may be shared by other storage devices. The first pair 612 may be shared by the second to fourth storage devices 620 to 640, the second pair 622 may be shared by the first, third, and fourth storage devices 610, 630, and 640, the third pair 632 may be shared by the first, second, and fourth storage devices 610, 620, and 640, and the fourth pair 642 may be shared by the first to third storage devices 610 to 630.

In accordance with the multicast communication protocol according to at least some example embodiments of the inventive concepts, each of the first to fourth storage devices 610 to 640 may include only one pair of submission and completion queues for communicating with the other storage devices, instead of including pairs of submission and completion queues, the number of which is the same as the number of other storage devices. For example, in the case where "N" storage devices communicate with each other, a conventional P2P communication method needs "N×(N−1)" pairs of submission and completion queues. However, according to at least some example embodiments of the inventive concepts, there is a need for only "N" pairs of submission and completion queues.

Figure 15:
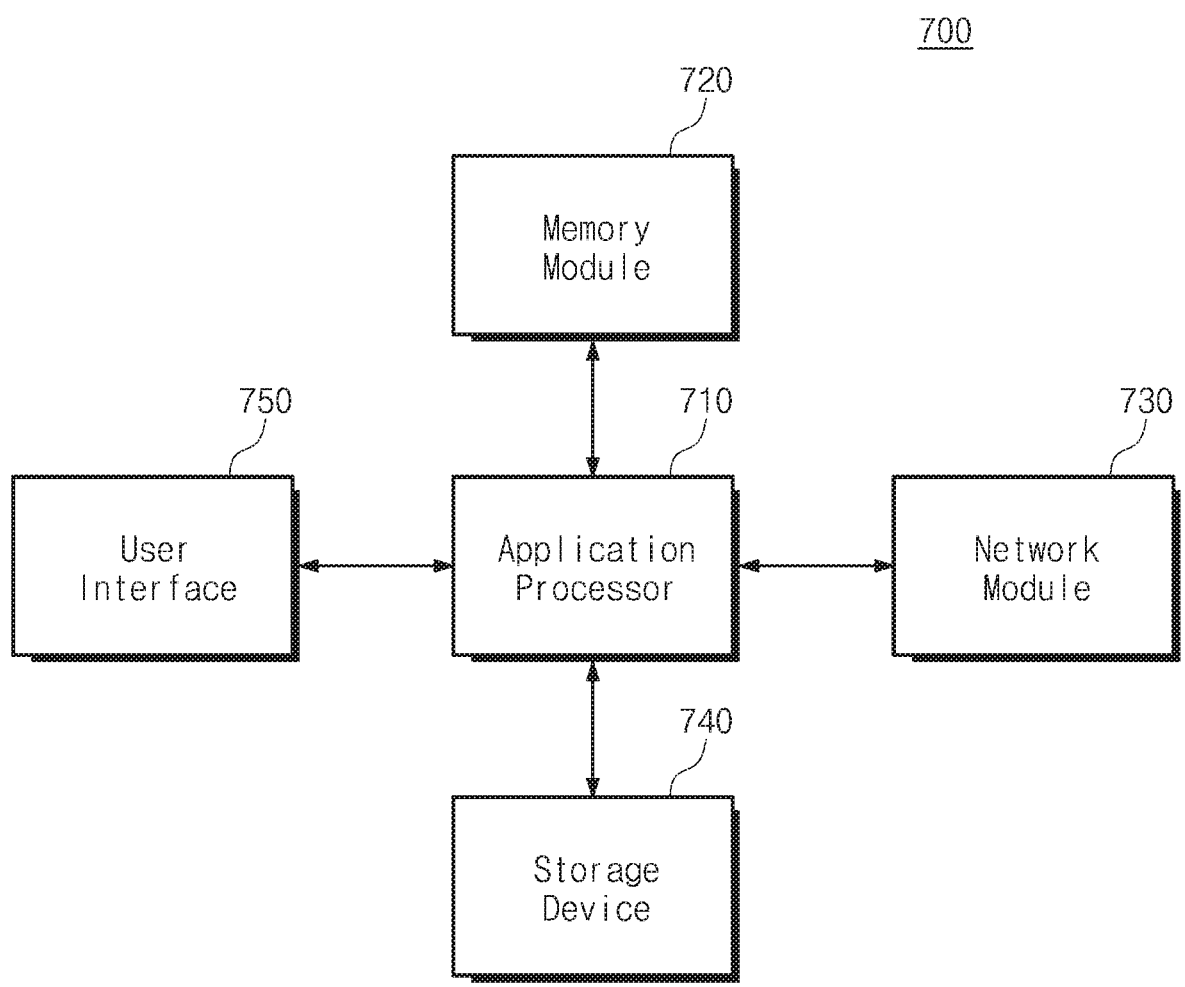
FIG. 15 is a block diagram illustrating a user system to which a multicast communication method according to at least some example embodiments of the inventive concepts is applied.

FIG. 15 is a block diagram illustrating a user system to which a multicast communication method according to at least some example embodiments of the inventive concepts is applied. Referring to FIG. 15, a user system 700 includes an application processor 710, a memory module 720, a network module 730, a storage device 740, and a user interface 750.

The application processor 710 may drive components and an operating system that are included in the user system 700. According to at least one example embodiment of the inventive concepts, the application processor 710 may include controllers to control components of the user system 700, interfaces, graphics engines, etc. The application processor 710 may be implemented with an SoC. The application processor 710 may refer to the host 11 of FIG. 1, the host 100 of FIG. 2, and a host described in FIGS. 4 to 6 and 8 to 13.

The memory module 720 may operate as a main memory, a working memory, a buffer memory, or a cache memory of the user system 700. The memory module 720 may include a high-speed memory device such as DDR4 SDRAM, LPDDR4 SDRAM, GDDRS SDRAM, or HBM.

The network module 730 may communicate with external devices. For example, the network module 730 may support wireless communications, such as code division multiple access (CDMA), global system for mobile communication (GSM), wideband CDMA (WCDMA), CDMA-2000, time division multiple access (TDMA), long term evolution (LTE), Wimax, WLAN, UWB, Bluetooth, WI-DI, and the like. The network module 730 may be included in the application processor 710.

The storage device 740 may store data. For example, the storage device 740 may store data received from the application processor 710. Alternatively, the storage device 740 may transmit data stored therein to the application processor 710. According to at least one example embodiment of the inventive concepts, the storage device 740 may refer to the first and second storage devices 12 and 15 of FIG. 1, the storage device 200 of FIG. 3, the first and second storage devices 310 and 320 of FIG. 4, the first to third storage devices 310 to 330 of FIG. 5, the first and second storage devices 420 and 430 of FIG. 12, the first and second storage devices 520 and 530 of FIG. 13, or the first to fourth storage devices 610 to 640 of FIG. 14. Also, the storage device 740 may operate depending on the multicast communication method described with reference to FIGS. 1 to 14.

The user interface 750 may include interfaces that input data or an instruction to the application processor 710 or output data to an external device. According to at least one example embodiment of the inventive concepts, the user interface 750 may include user input interfaces such as a keyboard, a keypad, buttons, a touch panel, a touch screen, a touch pad, a touch ball, a camera, a microphone, a gyroscope sensor, a vibration sensor, and a piezoelectric sensor. The user interface 750 may further include user output interfaces such as a liquid crystal display (LCD), an organic light-emitting diode (OLED) display device, an active matrix OLED (AMOLED) display device, a light-emitting diode (LED), a speaker, and a motor.

A multicast communication method according to at least some example embodiments of the inventive concepts may reduce latency due to a conventional P2P communication method.

With the multicast communication method according to at least some example embodiments of the inventive concepts, a host may access storage devices by using one submission queue and one completion queue.

With the multicast communication method according to at least some example embodiments of the inventive concepts, storage devices may mutually adjust load balance.

With the multicast communication method according to at least some example embodiments of the inventive concepts, it may be possible to flexibly cope with interruption or failure of the storage devices.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A storage device comprising:
a first memory device; and
a first controller, the first controller being configured to,
fetch a command from a host multicasting the command to the storage device and a first replica storage device including a second memory device and a second controller, the command indicating a logical address,
process the command based on the logical address, and
receive, from the first replica storage device, an acknowledgment signal indicating that the command has been processed by the first replica storage device, the second controller of the first replica storage device being configured to fetch the command of the host.

2. The storage device of claim 1, wherein the first controller is further configured such that, in response to receiving the acknowledgment signal, the first controller transmits completion information of the command to the host.

3. The storage device of claim 2,
wherein the first controller includes:
a first register; and
a second register, and
wherein the first controller is further configured to,
store first information about a submission queue of the host in the first register,
transmit the first information to the first replica storage device,
store second information about a completion queue of the host in the second register, and
transmit the second information to the first replica storage device.

4. The storage device of claim 1, wherein the first controller is further configured to determine whether the first replica storage device has stopped operating by,
transmitting, to the first replica storage device, an inquiry signal, and
determining whether a response signal responding to the inquiry signal is received, from the first replica storage device, by the first controller.

5. The storage device of claim 4, wherein the first controller is further configured such that, in response to determining that the first replica storage device has stopped operating, the first controller determines, as a new replica storage device, a second replica storage device.

6. The storage device of claim 4,
wherein the first controller is further configured to communicate with the first replica storage device according to at least one protocol from among a universal serial bus (USB) protocol, a small computer system interface (SCSI) protocol, a PCI express protocol, NVM express (NVMe) protocol, an ATA protocol, a parallel ATA (PATA) protocol, a serial ATA (SATA) protocol, and a serial attached SCSI (SAS) protocol, and
wherein the first controller is configured such that the first controller performs the transmitting of the inquiry signal and receive the response signal based on the at least one protocol.

7. The storage device of claim 1, wherein the first controller is further configured such that,
the first controller performs a modulo operation on the logical address,
the first controller performs the processing of the command and the receiving of the acknowledgment signal in response to a remainder of the modulo operation having a first value.

8. The storage device of claim 7, wherein the first controller is further configured to communicate with the first replica storage device and change the first value.

9. A storage device comprising:
a first memory device; and
a first controller, the first controller being configured to,
fetch a command from a host multicasting the command to the storage device and a master storage device including a second memory device and a second controller, the command indicating logical address;
process the command based on the logical address; and
transmit, to the master storage device, an acknowledgment signal indicating that the command has been processed, the second controller of the master storage device being configured to fetch the command of the host.

10. The storage device of claim 9,
wherein the first controller includes:
a first register; and
a second register, and
wherein the first controller is further configured to, store first information about a submission queue of the host in the first register, update the first information based on information received from at least one of the host and the master storage device, store second information about a completion queue of the host in the second register, and update the second information based on information received from at least one of the host and the master storage device.

11. The storage device of claim 9, wherein the first controller is further configured to determine whether the master storage device has stopped operating by, transmitting, to the master storage device, an inquiry signal, and determining whether a response signal responding to the inquiry signal is received, from the master storage device, by the first controller.

12. The storage device of claim 11, wherein the storage device is a first replica storage device, and the first controller is further configured such that, in response to determining that the master storage device has stopped operating, the first controller determines, as a new master storage device, a second replica storage device.

13. The storage device of claim 11, wherein the storage device is a first replica storage device, and the first controller is further configured such that, in response to determining that the master storage device has stopped operating, the first controller determines, as a new master storage device, the first replica storage device, and the first controller transmits completion information to the host in response to receiving an acknowledgment signal from a second replica storage device, the completion information indicating that processing of a command fetched from the host has been completed by the new master storage device and the second replica storage device.

14. The storage device of claim 9, wherein the first controller is further configured such that, the first controller performs a modulo operation on the logical address, the first controller performs the processing of the command and the transmitting of the acknowledgment signal in response to a remainder of the modulo operation having a first value.

15. The storage device of claim 14, wherein the first controller is further configured to communicate with the master storage device and change the first value.

16. A communication method of a host multicasting a command to first and second storage devices, the method comprising:

generating the command for controlling the first and second storage devices;

causing the first and second storage devices to fetch the command by updating at least a register of the first storage device; and receiving completion information of the command from the first storage device when the command is processed in the second storage device and the second storage device transmits an acknowledgment signal indicating that the command is processed to the first storage device, wherein the first storage device includes a first controller configured to fetch the command of the host and a first memory controlled by the first controller, and the second storage device includes a second controller configured to fetch the command of the host and a second memory controlled by the second controller.

17. The method of claim 16, further comprising:

updating, by the host, a register of the second storage device when updating the register of the first storage device.

18. The method of claim 16, wherein, when the host updates the register of the first storage device, a register of the second storage device is updated by the first storage device.

19. The method of claim 16, wherein the host includes a submission queue configured to store the command and a completion queue configured to store the completion information, and wherein a pair including the submission queue and the completion queue is shared by the first and second storage devices.

20. The method of claim 16, further comprising:

receiving the completion information of the command from the second storage device when the first storage device stops operating, wherein the receiving of the completion information of the command from the second storage device includes:

transmitting, at the second storage device, a signal for determining whether the first storage device has stopped operating, to the first storage device.

* * * * *